US008913822B2

(12) United States Patent
Matsuda et al.

(10) Patent No.: US 8,913,822 B2
(45) Date of Patent: Dec. 16, 2014

(54) LEARNING APPARATUS AND METHOD, IMAGE PROCESSING APPARATUS AND METHOD, PROGRAM, AND RECORDING MEDIUM

(75) Inventors: Yasuhiro Matsuda, Tokyo (JP); Takahiro Nagano, Kanagawa (JP); Masashi Uchida, Tokyo (JP)

(73) Assignee: Sony Corporation, Tokyo (JP)

( * ) Notice: Subject to any disclaimer, the term of this patent is extended or adjusted under 35 U.S.C. 154(b) by 168 days.

(21) Appl. No.: 13/433,606

(22) Filed: Mar. 29, 2012

(65) Prior Publication Data
US 2012/0294512 A1 Nov. 22, 2012

(30) Foreign Application Priority Data

May 19, 2011 (JP) ................................. 2011-112311

(51) Int. Cl.
G06K 9/36 (2006.01)
G06K 9/40 (2006.01)
G06T 3/40 (2006.01)

(52) U.S. Cl.
CPC ..... G06T 3/4053 (2013.01); *G06T 2207/10016* (2013.01); *G06T 2207/20081* (2013.01)
USPC .......................................................... 382/155

(58) Field of Classification Search
None
See application file for complete search history.

(56) References Cited

U.S. PATENT DOCUMENTS 5,946,044 A * 8/1999 Kondo et al. ................. 348/458
6,330,344 B1 12/2001 Kondo et al.
6,912,014 B2 * 6/2005 Kondo et al. ................. 348/581
2008/0199072 A1 * 8/2008 Kondo et al. ................. 382/155
2009/0033792 A1 * 2/2009 Kano et al. ..................... 348/441
2010/0001989 A1 * 1/2010 Okumura et al. ............. 345/214
2010/0202711 A1 * 8/2010 Kondo et al. ................. 382/254
2011/0081094 A1 * 4/2011 Damkat ........................ 382/254
2011/0211765 A1 * 9/2011 Nagumo et al. .............. 382/254
2011/0274370 A1 * 11/2011 Kondo et al. ................. 382/284
2012/0321214 A1 * 12/2012 Hosokawa et al. ........... 382/263
2013/0028538 A1 * 1/2013 Simske et al. ................ 382/300
2013/0034313 A1 * 2/2013 Lin et al. ...................... 382/299
2013/0148872 A1 * 6/2013 Aisaka et al. ................. 382/128

FOREIGN PATENT DOCUMENTS

EP 0 859 513 A2 8/1998
JP 2008-140012 6/2008

OTHER PUBLICATIONS

Extended European Search Report issued Oct. 16, 2012 in Patent Application No. 12167492.3.
Vadim Avrin, et al., "Restoration and Resolution Enhancement of Video Sequences" IEEE International Conference on Acoustics, Speech, and Signal Processing, XP010225675A, vol. 4, Apr. 21, 1997, pp. 2549-2552.

(Continued)

Primary Examiner — Vu Le
Assistant Examiner — Alexander J Lesnick
(74) Attorney, Agent, or Firm — Sony Corporation

(57) ABSTRACT

There is provided an image processing apparatus including a model-based processing unit that executes model-based processing for converting resolution and converting an image on the basis of a camera model and a predetermined model having aligning, with respect to a high-resolution image output one frame before, and a prediction operation unit that performs a prediction operation on a pixel value of a high-resolution image to be output, on the basis of parameters stored in advance, an observed low-resolution image that is an input low-resolution image, and an image obtained by executing the model-based processing.

9 Claims, 19 Drawing Sheets

(56) References Cited

OTHER PUBLICATIONS

Hao Hu, et al., "Adaptive Image Restoration Based on Local Robust Blur Estimation", Advanced Concepts for Intelligent Vision Systems, XP019069055A, Aug. 28, 2007, pp. 461-472.

Jing Tian, et al., "A Survey on Super-Resolution Imaging", Signal, Image and Video Processing, XP019941925, vol. 5, No. 3, Feb. 3, 2011, pp. 329-342.

M. Zhao, et al., "Making the Best of Legacy Video on Modern Displays" Journal of the SID, XP040426572A, vol. 15, No. 1, Jun. 6, 2006, pp. 49-60.

Frank M. Candocia, et al., "Super-Resolution of Images Based on Local Correlations", IEEE Transactions on Neural Networks, XP011039280A, vol. 10, No. 2, Mar. 1, 1999, pp. 372-380.

* cited by examiner

LEARNING APPARATUS AND METHOD, IMAGE PROCESSING APPARATUS AND METHOD, PROGRAM, AND RECORDING MEDIUM

BACKGROUND

The present disclosure relates to a learning apparatus and method, an image processing apparatus and method, a program, and a recording medium, and particularly, to a learning apparatus and method, an image processing apparatus and method, a program, and a recording medium that enable a high-accuracy resolution interpolation to be performed at a high speed.

In the past, high-quality image processing has been put to practical use. For example, when resolution of an input signal does not satisfy resolution of a display screen, super-resolution technology that is used as resolution interpolation technology for compensating for the resolution is known. If the super-resolution technology is used, insufficient pixels can be interposed and more real video can be enjoyed, when video software having standard resolution is viewed using a full-HD wide screen television.

The super-resolution technology of related art estimates pixels of a high-resolution image from a low-resolution image by a repeated operation and generally executes the following processing.

First, a camera model (deterioration model) and camera movement (aligning) are estimated in advance. In addition, a high-resolution image is corrected gradually by a repeated operation such that an error (difference) of an estimated low-resolution image obtained from the high-resolution image through an estimation model and an actually observed low-resolution image decreases, to become similar to an ideal image.

For example, in the camera model (deterioration model), blur (optical blur, motion blur, and PSF), pixel number conversion (down conversion and progressive interlace conversion), and noise are considered. In the aligning, an estimation of camera movement or object movement with sub-pixel accuracy is used. When the camera model and the aligning are accurately known, a high-resolution image that has no aliasing can be restored.

In addition, technology for adding a feedback value calculated by a super-resolution processor to a high-resolution image stored in a buffer, adding a high-resolution image obtained by first addition processing to a feedback value obtained by a next super-resolution processor, and generating a high-resolution image by super-resolution processing using a Gauss-Seidel method is suggested (for example, refer to Japanese Patent Application Laid-open No. 2008-140012).

SUMMARY

However, in the technology of related art, the camera model or the aligning is not completely specified and the inside of a screen is not described with a uniform model. If an estimation error occurs in the camera model or the aligning and appropriate high-resolution image correction is not performed, bad effects such as overemphasis of an edge or detailed portion, overshoot, and emphasis of noise occur and this leads to deteriorating image quality.

Technology for preventing the deterioration of the image quality or the emphasis of the noise from advance information of the image is considered to prevent the bad effects (called a reconstruction-type super-resolution MAP method). However, this technology is not sufficient to prevent the bad effects, because performance greatly depends on the advance information of the image and it is difficult to satisfy all of aliasing performance, a sense of resolution, suppression of overshoot, and suppression of noise.

In the technology of related art, because a processing load by a repeated operation is large, it is difficult to realize high-speed processing.

The present disclosure has been made in view of the above circumstances and enables high-accuracy resolution interpolation to be performed at a high speed.

According to an embodiment of the present technology, there is provided an image processing apparatus which includes a model-based processing unit that executes model-based processing for converting resolution and converting an image on the basis of a camera model and a predetermined model having aligning, with respect to a high-resolution image output one frame before, and a prediction operation unit that performs a prediction operation on a pixel value of a high-resolution image to be output, on the basis of parameters stored in advance, an observed low-resolution image that is an input low-resolution image, and an image obtained by executing the model-based processing.

The prediction operation unit can read the parameter stored in a learning database generated in advance by learning and perform the prediction operation.

The model-based processing unit can include a motion compensating unit that compensates for a motion of the high-resolution image output one frame before, a down sampler that restricts a band of the motion compensated high-resolution image output one frame before according to the camera model, thins out pixels, and generates an estimated low-resolution image, a difference computation unit that computes a difference of the observed low-resolution image that is the input low-resolution image and the estimated low-resolution image and generates difference image data, and an up sampler that interpolates pixels of the difference image data and thereby generates a high-resolution image.

The model-based processing unit can include a blur adding unit that adds blur to the high-resolution image output one frame before, and a blur removing unit that removes the blur added by the blur adding unit.

A class sorting unit that sorts attention pixels for each class on the basis of a feature amount calculated in the course of the model-based processing can be further included. The prediction operation unit can perform a predetermined operation using coefficients stored in advance as parameters corresponding to the sorted classes and performs the prediction operation on the pixel value of the high-resolution image to be output.

A tap extracting unit that extracts predetermined pixels of the observed low-resolution image that is the input low-resolution image and predetermined pixels of the image obtained by executing the model-based processing with respect to the high-resolution image output one frame before as taps can be further included. The prediction operation unit can perform a predetermined operation regarding the taps on the basis of the parameters stored in advance, and performs the prediction operation on the pixel value of the high-resolution image to be output.

According to the embodiment of the present technology, there is provided an image processing method which includes executing, by a model-based processing unit, model-based processing for converting resolution and converting an image on the basis of a camera model and a predetermined model having aligning, with respect to a high-resolution image output one frame before, and performing, by a prediction operation unit, a prediction operation on a pixel value of a high-resolution image to be output, on the basis of parameters stored in advance, an observed low-resolution image that is an input low-resolution image, and an image obtained by executing the model-based processing.

According to the embodiment of the present technology, there is provided a program for causing a computer to function as an image processing apparatus. The image processing apparatus includes a model-based processing unit that executes model-based processing for converting resolution and converting an image on the basis of a camera model and a predetermined model having aligning, with respect to a high-resolution image output one frame before, and a prediction operation unit that performs a prediction operation on a pixel value of a high-resolution image to be output, on the basis of parameters stored in advance, an observed low-resolution image that is an input low-resolution image, and an image obtained by executing the model-based processing.

According to the embodiment of the present technology, there is provided a recording medium in which the program according to claim 8 is recorded.

According to another embodiment of the present technology, there is provided a learning apparatus which includes a model-based processing unit that executes model-based processing for converting resolution and converting an image on the basis of a camera model and a predetermined model having aligning, with respect to a high-resolution image output one frame before, a tap extracting unit that extracts predetermined pixels of a student image with low resolution obtained by converting resolution of a teacher image with high resolution and predetermined pixels of an image obtained by executing the model-based processing with respect to the high-resolution image output one frame before as taps, a sample accumulating unit that accumulates equations including the taps, predetermined parameters, and a pixel value of the teacher image as samples, and a parameter calculating unit that calculates the predetermined parameters used in a prediction operation of a pixel value of a high-resolution image to be output, on the basis of the accumulated samples.

A database that stores the calculated parameters can be further included. The database can be used in image processing of an image processing apparatus for converting an input low-resolution image into a high-resolution image.

The model-based processing unit can include a motion compensating unit that compensates for a motion of the high-resolution image output one frame before, a down sampler that restricts a band of the motion compensated high-resolution image output one frame before according to the camera model, thins out pixels, and generates an estimated low-resolution image, a difference computation unit that computes a difference of the student image and the estimated low-resolution image and generates difference image data, and an up sampler that interpolates pixels of the difference image data and generates a high-resolution image.

The model-based processing unit can include a blur adding unit that adds blur to the high-resolution image output one frame before, and a blur removing unit that removes the blur added by the blur adding unit.

A class sorting unit that sorts attention pixels for each class on the basis of a feature amount calculated in the course of the model-based processing can be further included. The parameter calculating unit can calculate coefficients by which the taps are multiplied when the prediction operation is performed on the pixel value of the high-resolution image to be output as parameters corresponding to the sorted classes.

According to the embodiment of the present technology, there is provided a learning method which includes executing, by a model-based processing unit, model-based processing for converting resolution and converting an image on the basis of a camera model and a predetermined model having aligning, with respect to a high-resolution image output one frame before, extracting, by a tap extracting unit, predetermined pixels of a student image with low resolution obtained by converting resolution of a teacher image with high resolution and predetermined pixels of an image obtained by executing the model-based processing with respect to the high-resolution image output one frame before as taps, accumulating, by a sample accumulating unit, equations including the taps, predetermined parameters, and a pixel value of the teacher image as samples, and calculating, by a parameter calculating unit, the predetermined parameters used in a prediction operation of a pixel value of a high-resolution image to be output, on the basis of the accumulated samples.

According to the embodiment of the present technology, there is provided a program for causing a computer to function as a learning apparatus. The learning apparatus includes a model-based processing unit that executes model-based processing for converting resolution and converting an image on the basis of a camera model and a predetermined model having aligning, with respect to a high-resolution image output one frame before, a tap extracting unit that extracts predetermined pixels of a student image with low resolution obtained by converting resolution of a teacher image with high resolution and predetermined pixels of an image obtained by executing the model-based processing with respect to the high-resolution image output one frame before as taps, a sample accumulating unit that accumulates equations including the taps, predetermined parameters, and a pixel value of the teacher image as samples, and a parameter calculating unit that calculates the predetermined parameters used in a prediction operation of a pixel value of a high-resolution image to be output, on the basis of the accumulated samples.

According to the embodiment of the present technology, model-based processing is executed for converting resolution and converting an image on the basis of a camera model and a predetermined model having aligning, with respect to a high-resolution image output one frame before, predetermined pixels of a student image with low resolution obtained by converting resolution of a teacher image with high resolution and predetermined pixels of an image obtained by executing the model-based processing with respect to the high-resolution image output one frame before are extracted as taps, equations are accumulated, which include the taps, predetermined parameters, and a pixel value of the teacher image as samples, and the predetermined parameters are calculated, which are used in a prediction operation of a pixel value of a high-resolution image to be output, on the basis of the accumulated samples.

According to the embodiments of the present disclosure described above, high-accuracy resolution interpolation can be performed at a high speed.

DETAILED DESCRIPTION OF THE EMBODIMENT(S)

Figure 1:
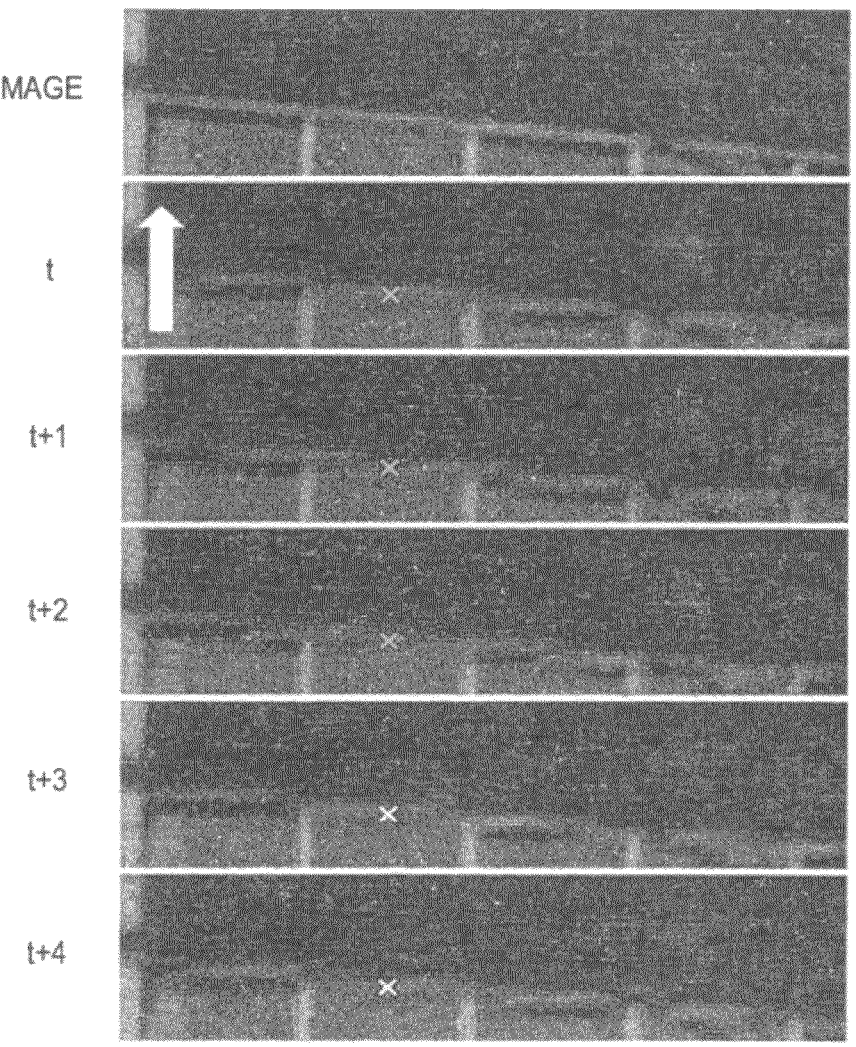
FIG. 1 is a diagram illustrating an example of an image that is obtained by up conversion technology of related art using pixels in a screen of one frame.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

First, super-resolution technology of related art will be described.

FIG. 1 illustrates an example of an image on which high-quality image processing is executed using up conversion technology of related art. In this example, an image of a standard definition (SD) interlace (i) signal is converted into an image of a high definition (HD) progressive (p) signal. Images illustrated in FIG. 1 are motion pictures. In this example, images of individual frames at times t to t+4 are displayed. In this example, the high-quality image processing is executed on the basis of pixels in a screen of one frame. For example, a pixel of one HDp signal is generated on the basis of pixels of a plurality of SDi signals. That is, an example of the case in which an image is up-converted is illustrated.

In FIG. 1, an image of an HDp signal to be generated originally as an ideal image is illustrated at an uppermost stage. In FIG. 1, the images of the individual frames of the times t to t+4 that are images obtained by executing the high-quality image processing on the SDi signals are arranged and displayed sequentially from an upper stage to a lower stage.

Figure 2:
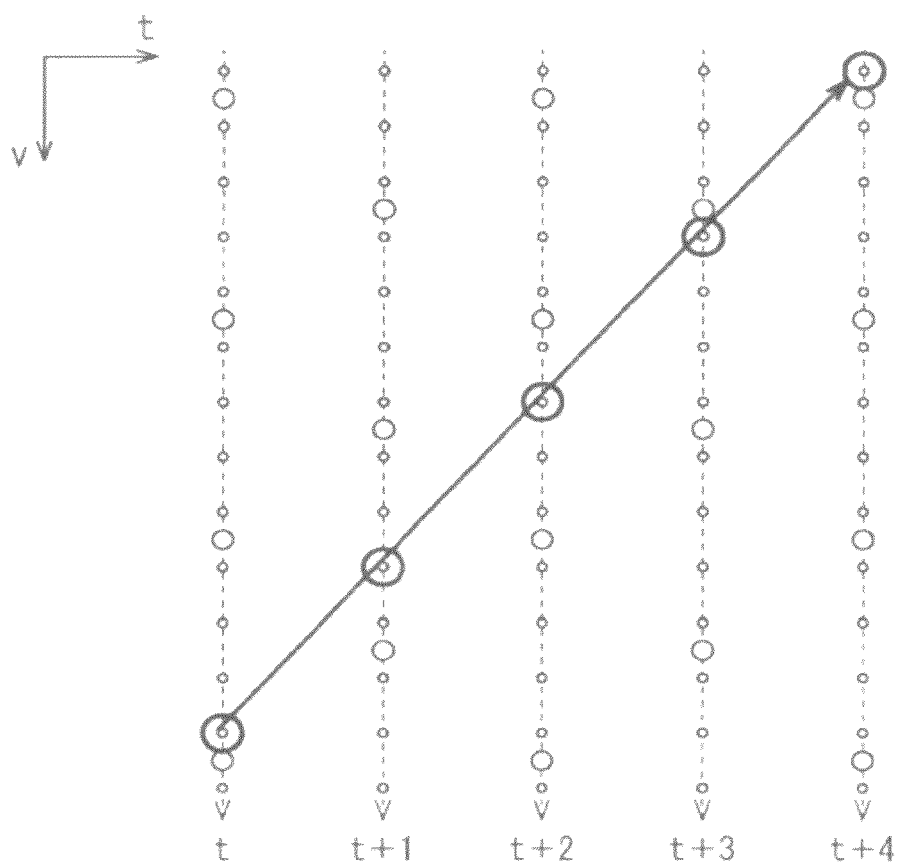
FIG. 2 is a diagram illustrating positions of a pixel of an SDi signal and a pixel of an HDp signal.

In FIG. 2, a longitudinal axis shows a pixel position of a vertical direction, a transverse axis shows a time, and the pixels of the SDi signals and the pixels of the HDp signals that are generated (interpolated) by executing the high-quality image processing using the super-resolution technology are illustrated by circular figures. The pixels of the SDi signals are illustrated by relatively large hatched circles and the pixels of the HDp signals are illustrated by relatively small black circles.

Because an image on which the high-quality image processing is executed is an image having motion, the pixels that are shown by x marks in FIG. 1 move in a vertical direction. That is, the black circles that are surrounded with circles illustrated in FIG. 2 correspond to the pixels shown by the x marks in FIG. 1.

As described above, because the high-quality image processing is executed on the basis of the pixels in the screen of one frame, interpolation accuracy of pixels of an image that is configured by the pixels of the HDp signals at the positions apart from the positions of the pixels of the SDi signals generally becomes low.

For example, as illustrated in FIG. 2, the pixel of the HDp signal surrounded with the circle in the frame of the time t+2 is apart from the positions of the pixels of the SDi signals. For this reason, in the image of the frame of the time t+2 of FIG. 1, interpolation accuracy of the pixels of the image near the position shown by the x mark is low.

Meanwhile, when the high-quality image processing is executed using pixels of images of frames of a plurality of times existing before (in the past), the interpolation accuracy of the pixels of the image that is configured by the pixels of the HDp signals at the positions apart from the positions of the pixels of the SDi signals can be improved.

Figure 3:
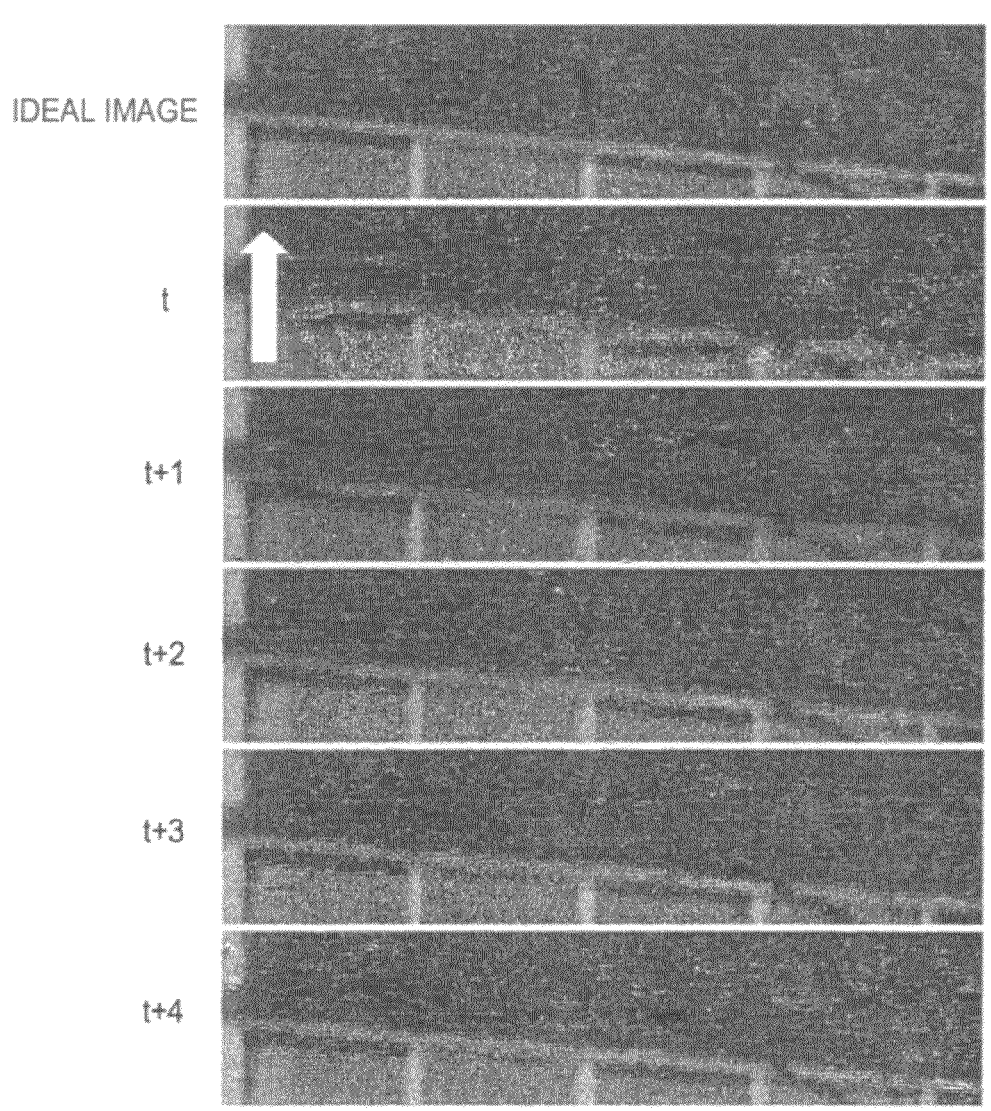
FIG. 3 is a diagram illustrating an example of an image that is obtained by super-resolution technology of related art using pixels of a plurality of images generated in the past.

FIG. 3 illustrates an example of an image on which the high-quality image processing is executed using the super-resolution technology of related art. In this example, the case in which an image of an SDi signal is converted into an image of an HDp signal is illustrated. Images illustrated in FIG. 3 are motion pictures. In this example, images of individual frames of times t to t+4 are displayed. In this example, the high-quality image processing is executed on the basis of pixels of a plurality of images generated in the past. For example, a pixel of one HDp signal is generated on the basis of pixels of a plurality of SDi signals.

In FIG. 3, an image of an HDp signal to be generated originally as an ideal image is illustrated at an uppermost stage. In FIG. 3, images of individual frames of the times t to t+4 that are images obtained by executing the high-quality image processing using the super-solution technology of related art on the SDi signals are arranged and displayed sequentially from an upper stage to a lower stage.

Figure 4:
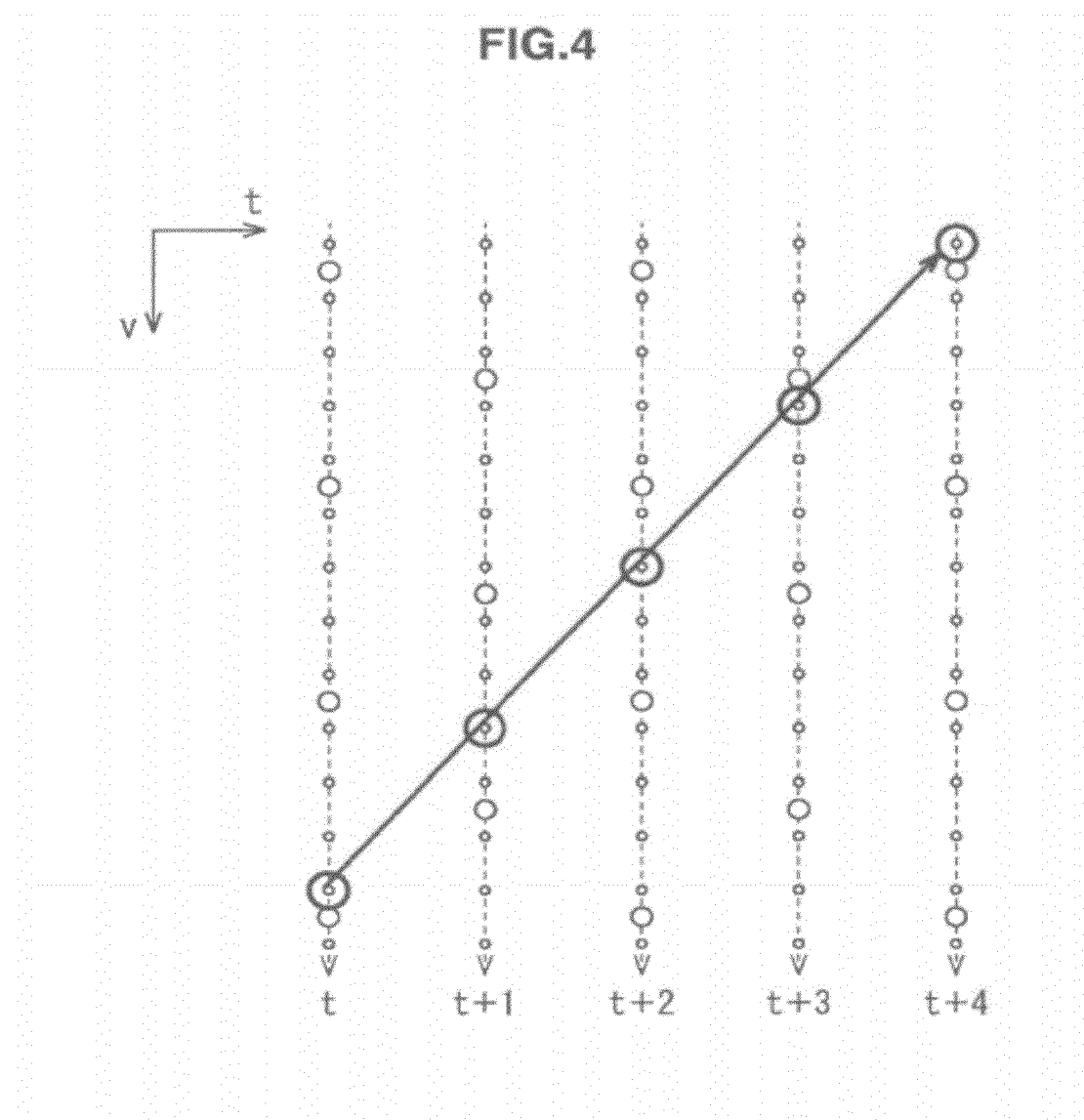
FIG. 4 is a diagram illustrating positions of a pixel of an SDi signal and a pixel of an HDp signal.
Figure 5:
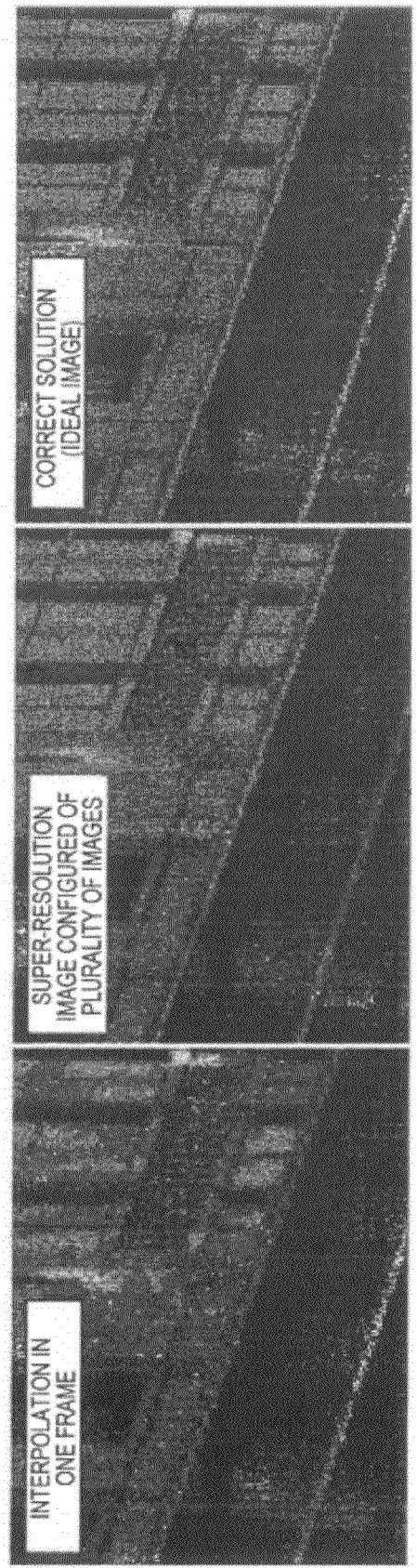
FIGS. 5A to 5C are diagrams illustrating an example of images obtained by super-resolution technology when pixels in a screen of one frame are used and when pixels of a plurality of images generated in the past are used.
Figure 6:
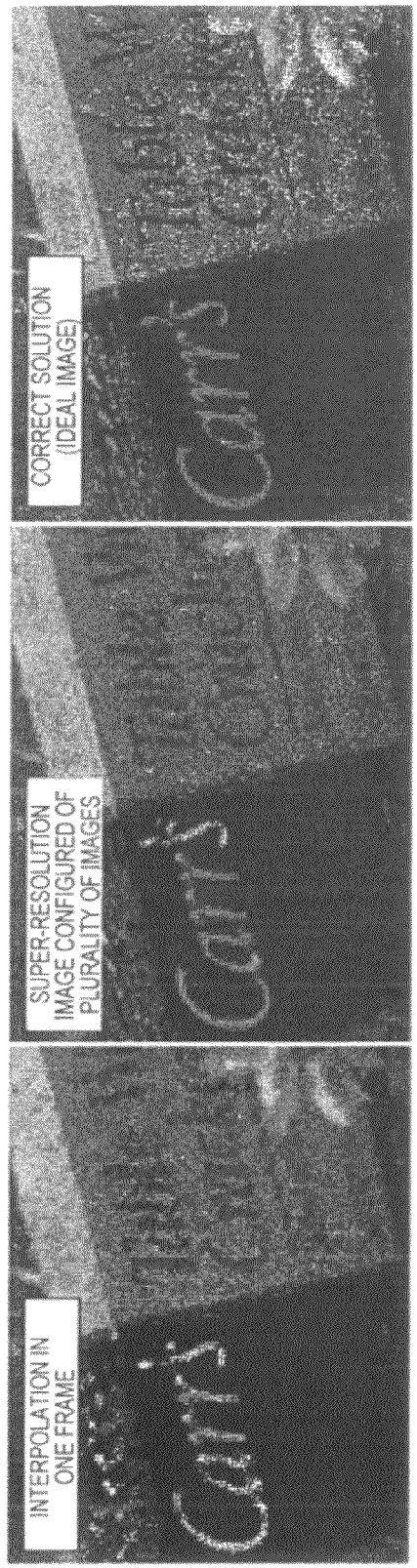
FIGS. 6A to 6C are diagrams illustrating an example of images different from the example of FIGS. 5A to 5C.

In FIG. 4, a longitudinal axis shows a pixel position of a vertical direction, a transverse axis shows a time, and pixels of the SDi signals and pixels of the HDp signals that are generated (interpolated) by executing the high-quality image processing using the super-resolution technology are illustrated by circular figures. The pixels of the SDi signals are illustrated by relatively large hatched circles and the pixels of the HDp signals are illustrated by relatively small black circles.

Different from the case of FIG. 1, in the case of the images illustrated in FIG. 3, the images are displayed clearly as time passes. For example, in the image illustrated at the time t+4, different from the case of FIG. 1, the pixels of the positions that are apart from the positions of the pixels of the SDi signals are displayed clearly and a detailed portion such as an edge of the image is also displayed clearly.

FIGS. 5A to 6C illustrate another example of an image obtained by super-resolution technology using pixels in a screen of one frame and an image obtained by super-resolution technology using pixels of a plurality of images generated in the past.

FIGS. 5C and 6C illustrate ideal images that are similar to images of actual objects, respectively. In the case of FIG. 5C, an image that includes a number of edges is displayed and in the case of FIG. 6C, an image that includes a number of characters is displayed.

FIG. 5A illustrates an example of an image that is obtained by the high-quality image processing executed on the basis of pixels in a screen of one frame and FIG. 5B illustrates an example of an image that is obtained by the high-quality image processing executed using pixels of a plurality of images generated in the past. For example, in the case of FIG. 5A, aliasing distortion occurs in the vicinity of an image that becomes an edge in a screen. Meanwhile, in the case of FIG. 5B, an image that is more similar to the ideal image (refer to FIG. 5C) is obtained. In the case of FIG. 5B, image quality can approach quality of the ideal image using the pixels of the plurality of images.

FIG. 6A illustrates an example of an image that is obtained by the high-quality image processing executed on the basis of pixels in a screen of one frame and FIG. 6B illustrates an example of an image that is obtained by the high-quality image processing executed using pixels of a plurality of images generated in the past. For example, in the case of FIG. 6A, images of characters in a screen are displayed unclearly. Meanwhile, in the case of FIG. 6B, an image that is more similar to the ideal image (refer to FIG. 6C) is obtained. In the case of FIG. 6B, image quality can approach quality of the ideal image using a repeated operation to be described below.

As such, in the cases of FIGS. 5A to 6C, the image that is similar to the ideal image can be obtained by executing the high-quality image processing using the pixels of the plurality of images generated in the past.

Figure 7:
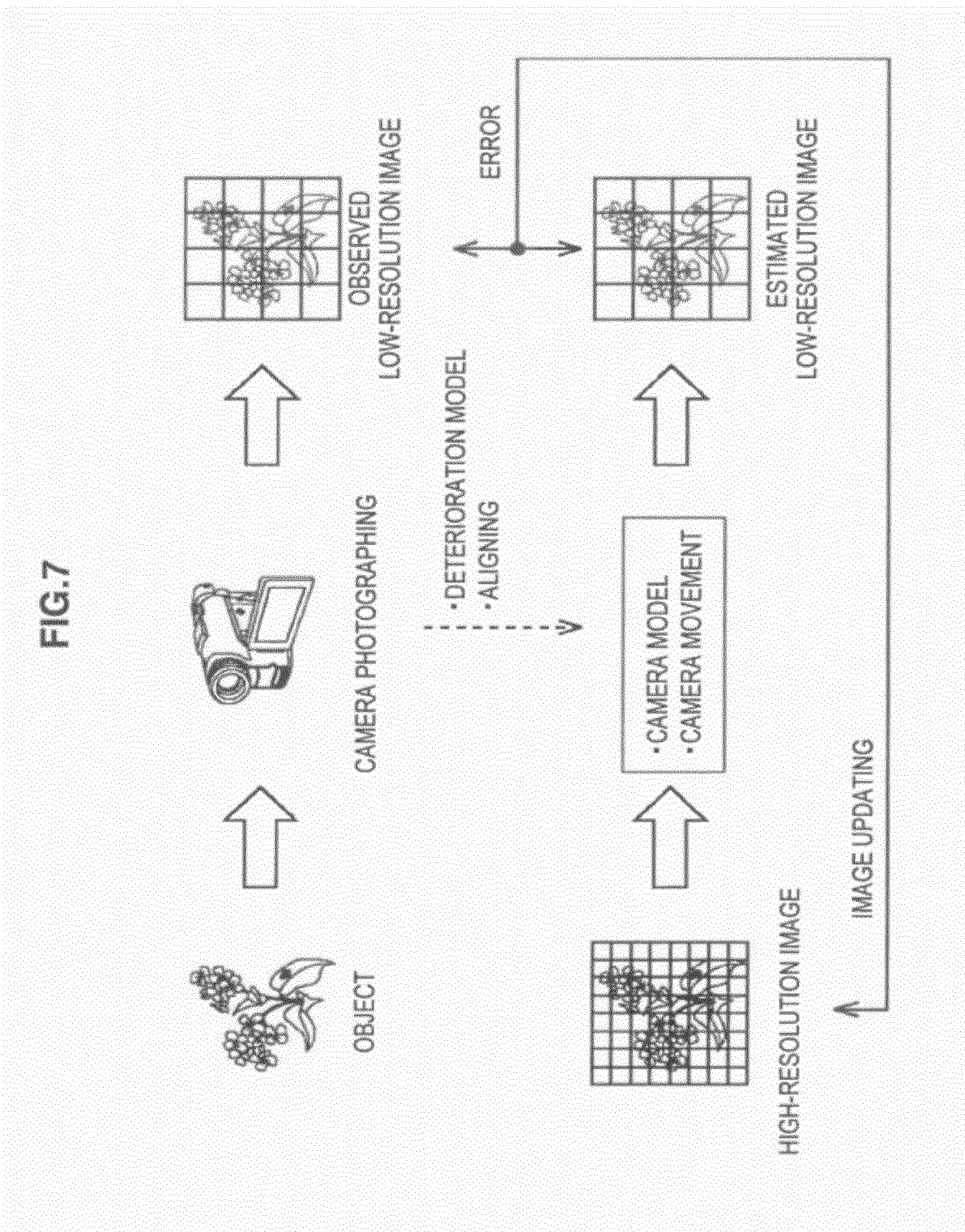
FIG. 7 is a conceptual diagram illustrating super-resolution technology of related art.
Figure 8:
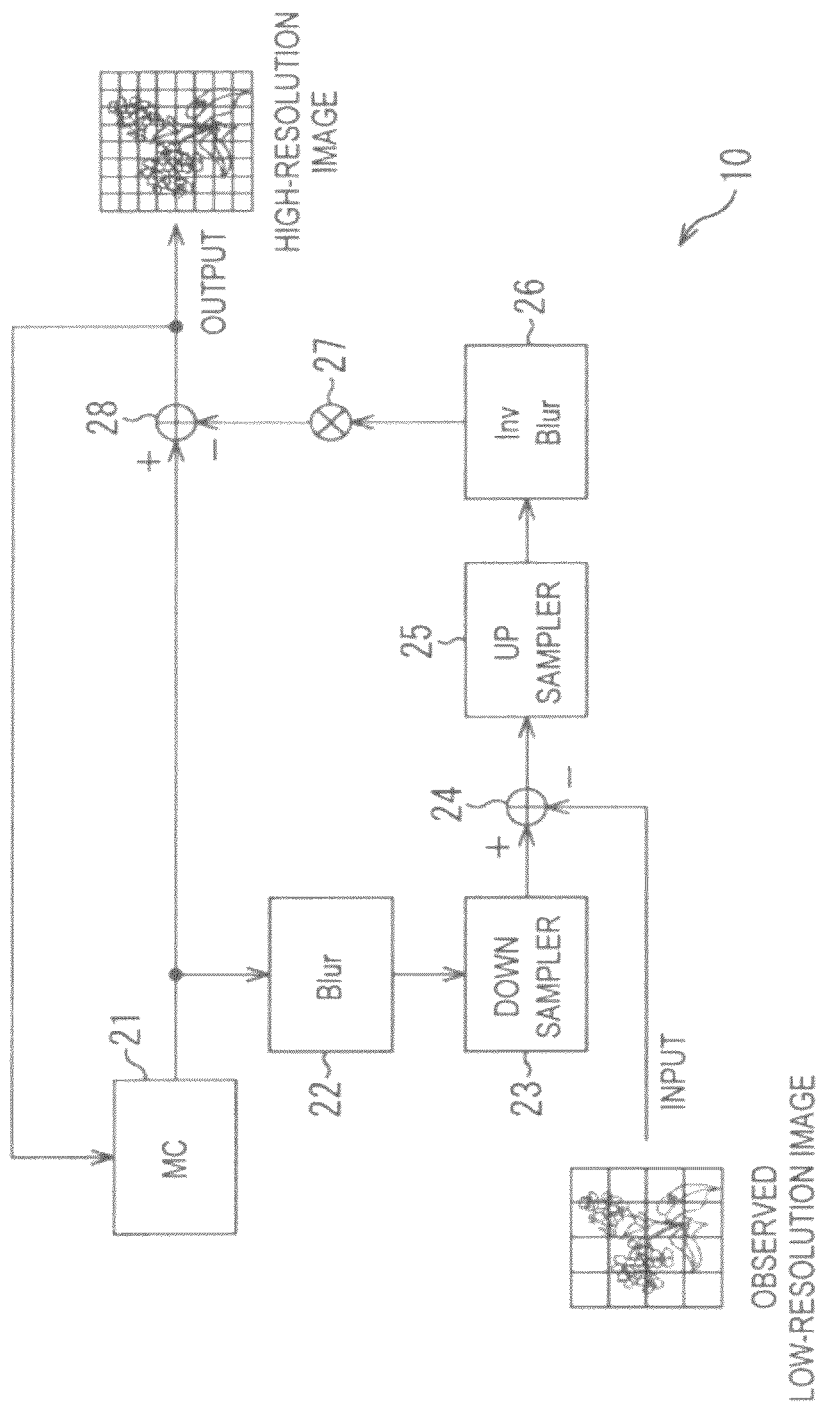
FIG. 8 is a block diagram illustrating a configuration example of an image processing apparatus in which the super-resolution technology of related art is adopted.

FIGS. 7 and 8 are diagrams illustrating super-resolution technology of related art. In these examples, the high-quality image processing converts a low-resolution image into a high-resolution image and is executed using the pixels of the plurality of images generated in the past.

In the super-resolution technology of related art, as illustrated in FIG. 7, an object is photographed by a camera and an observed low-resolution image (for example, image of an SDi signal) is obtained.

Meanwhile, a camera model (deterioration model) and camera movement (aligning) when the object is photographed by the camera are added to a high-resolution image (for example, an image of an HDp signal) one frame before. For example, blur is intentionally added to the high-resolution image one frame before and motion is compensated. Then, an image is down-sampled and the image is converted into a low-resolution image. As a result, an estimated low-resolution image (for example, an image of an SDi signal) is obtained.

A difference value (error) of each pixel of the estimated low-resolution image and each pixel of the observed low-resolution image is computed and a high-resolution image is updated to decrease the error.

The high-resolution image is updated by repeating the above processing with respect to one frame several times. The quality of the high-resolution image gradually approaches the quality of the ideal image. As such, processing for repeating updating of the pixel value of the high-resolution image may be called a repeated operation.

For example, when the repeated operation is performed three times, the quality of the image can further approach the quality of the ideal image as compared with when the repeated operation is performed two times. As such, if the pixel of the high-resolution image updated by most recent operation processing is updated by the repeated operation, the quality of the high-resolution image gradually approaches the quality of the ideal image.

FIG. 8 is a block diagram illustrating a configuration example of an image processing apparatus in which the super-resolution technology of related art is adopted. An image processing apparatus 10 illustrated in FIG. 8 includes a motion compensating unit (MC) 21, a blur adding unit (Blur) 22, a down sampler 23, an adder 24, an up sampler 25, a blur removing unit (InvBlur) 26, a multiplier 27, and an adder 28.

The motion compensating unit 21 receives an immediately previously updated high-resolution image, calculates a motion vector, and compensates for motion. An image that is output from the motion compensating unit 21 is called the immediately previously updated high-resolution image after the motion compensation. The immediately previously updated high-resolution image after the motion compensation is supplied to the blur adding unit 22.

The blur adding unit 22 adds blur occurring when the object is photographed by the camera to the immediately previously updated high-resolution image after the motion compensation. That is, the PSF or the optical blur of the camera is estimated (simulated) and an image is generated. In this case, estimating (simulating) the PSF or the optical blur of the camera on the basis of the predetermined image and generating the image is called adding the blur. The immediately previously updated high-resolution image after the motion compensation in which the blur is added is supplied to the down sampler 23.

The down sampler 23 thins out the pixels of the immediately previously updated high-resolution image after the motion compensation in which the blur is added and generates a low-resolution image. Thereby, the estimated low-resolution image is generated.

The adder 24 computes a difference value (error) of each pixel of the estimated low-resolution image and each pixel of the observed low-resolution image. The computation result is supplied to the up sampler 25.

The up sampler 25 interpolates pixels with respect to data of the computation result by the adder 24 to generate a high-resolution image and supplies the high-resolution image to the blur removing unit (InvBlur) 26.

The blur removing unit 26 removes the blur of the supplied high-resolution image. That is, processing for removing the blur added by the blur adding unit 22 is executed.

The blur adding unit 22 and the blur removing unit 26 may not be provided.

The multiplier 27 multiplies a pixel value of each pixel of the high-resolution image output from the blur removing unit 26 with predetermined gain and outputs the multiplication result to the adder 28.

The adder 28 adds each pixel of the immediately previously updated high-resolution image after the motion compensation and the computation result of the multiplier 27 and outputs the addition result as a high-resolution image.

Figure 9:
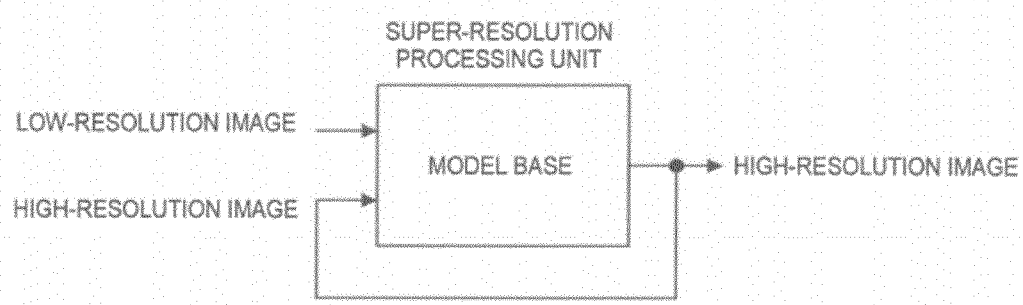
FIG. 9 is a diagram illustrating the case in which processing executed by the image processing apparatus of related art is simplified.

That is, if the image processing apparatus 10 of related art is simply described, as illustrated in FIG. 9, the image processing apparatus 10 of related art converts the low-resolution image and the fed back high-resolution image by a model base and generates a high-resolution image. That is, the motion compensation or the blur adding or removing can be considered processing based on an image conversion model provided as the camera model and an image conversion model provided as the aligning and this image conversion is called model-based processing.

With regard to the feedback in the above example, the immediately previously high-resolution image is fed back. In addition, the immediately previously updated high-resolution image is fed back and updated. The high-resolution image is updated by repeating the feedback several times with respect to one frame.

The model base in FIG. 9 shows the concept of the processing and corresponds to processing of the motion compensating unit 21, the blur adding unit 22, and the down sampler 23 of FIG. 8 and reverse conversion processing thereof.

However, the camera model or the aligning is not perfectly specified and the inside of a screen is not described with a uniform model. That is, it is difficult to appropriately construct the model base illustrated in FIG. 9. If an estimation error occurs in the camera model or the aligning and appropriate high-resolution image correction is not performed, bad effects such as overemphasis of an edge or detailed portion, overshoot, and emphasis of noise occur and this leads to deteriorating image quality.

Technology for preventing the deterioration of the image quality or the emphasis of the noise from advance information of the image is considered to prevent the bad effects (called a reconstruction-type super-resolution MAP method). However, this technology is not sufficient to prevent the bad effects, because performance greatly depends on the advance information of the image and it is difficult to satisfy all of aliasing performance, a sense of resolution, suppression of overshoot, and suppression of noise.

In the technology of related art, because the processing load by the repeated operation repeated several times with respect to one frame is large as described above, it is difficult to realize high-speed processing.

Figure 10:
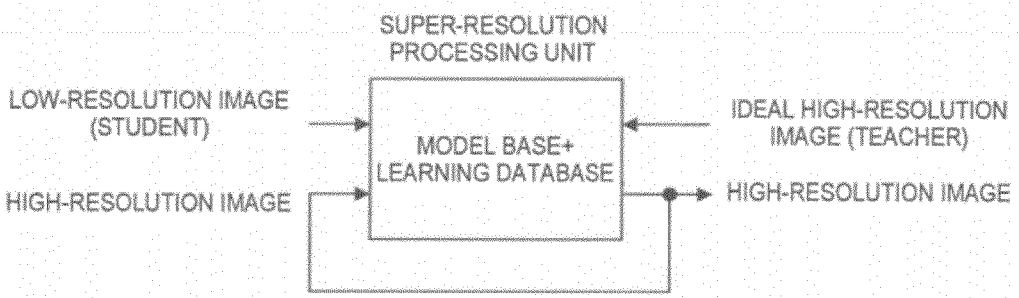
FIG. 10 is a diagram illustrating the case in which processing executed by an image processing apparatus to which the present disclosure is applied is simplified.

Therefore, in the present disclosure, as illustrated in FIG. 10, processing using a learning database is added to the model-based processing. That is, a high-resolution image is set as a teacher image and a low-resolution image generated by deteriorating the teacher image is set as a student image, the high-resolution image and the low-resolution image are input to the image processing apparatus, and the high-resolution image is generated from the student image. The generated high-resolution image and the teacher image are compared with each other and parameters to estimate a pixel value of the high-resolution image are calculated (learned) and stored in the learning database.

Figure 11:
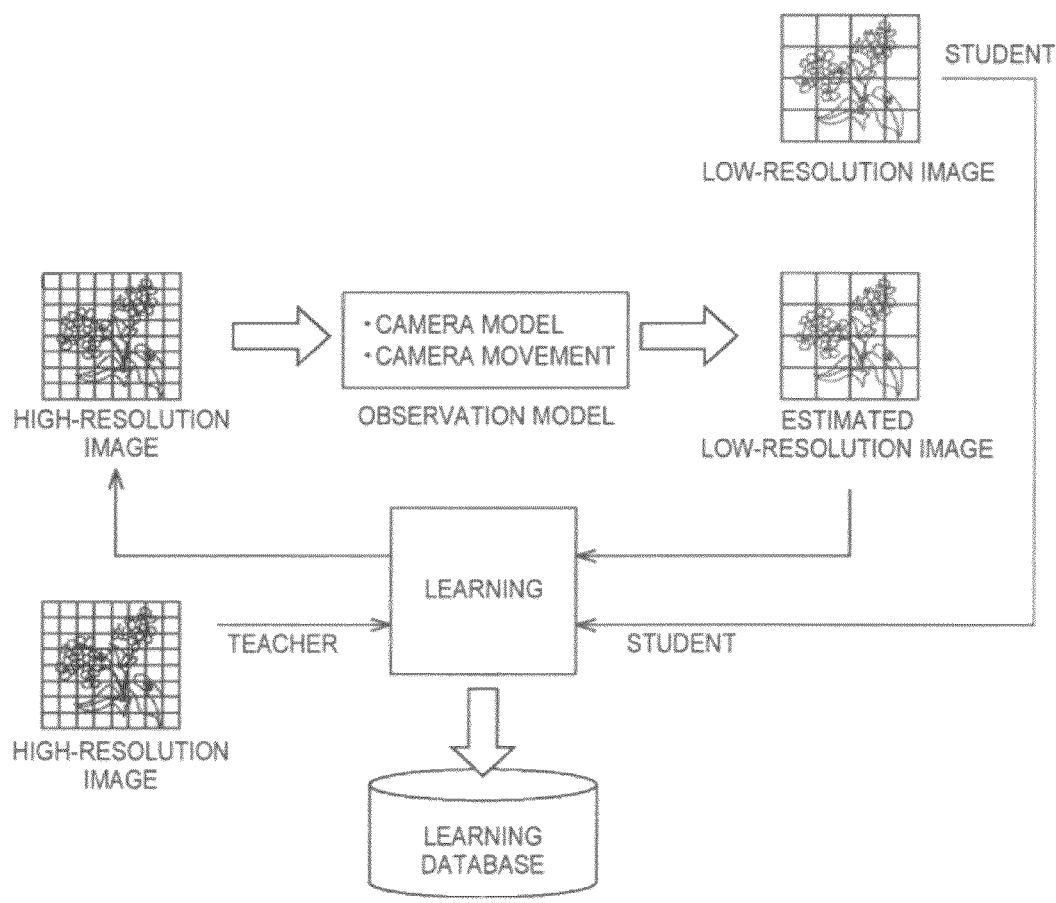
FIG. 11 is a conceptual diagram illustrating learning of coefficients in the present disclosure.

For example, as illustrated in FIG. 11, the low-resolution image (for example, the image of the SDi signal) that is input as the student image is handled as the observed low-resolution image.

Meanwhile, the camera model (deterioration model) and the camera movement (aligning) when the object is photographed by the camera are added to the high-resolution image (for example, the image of the HDp signal) one frame before. For example, the blur is added intentionally to the high-resolution image one frame before and the motion is compensated. As a result, the estimated low-resolution image (for example, image of the SDi signal) is obtained. In this case, estimating (simulating) the PSF or the optical blur of the camera on the basis of the predetermined image and generating the image is called adding the blur.

A difference value (error) of each pixel of the estimated low-resolution image and each pixel of the observed low-resolution image is computed and the high-resolution image is updated through learning of information necessary for generating the high-resolution image.

In this case, predetermined coefficients to estimate the pixel of the high-resolution image are learned on the basis of the pixel of the observed low-resolution image and the pixel of the motion-compensated, high-resolution image one frame before. For example, a pixel value of the teacher image is set to yt, a pixel value of the student image is set to xi, a pixel value of the motion-compensated, high-resolution image one frame before is set to xj, and a linear expression represented by expression 1 is assumed.

$$y_t = \sum_i^N W_i X_i + \sum_j^M W_j X_j \quad (1)$$

In this case, a coefficient wi in expression 1 shows a coefficient that is multiplied with the pixel value of the observed low-resolution image and a coefficient wj shows a coefficient that is multiplied with the pixel value of the motion-compensated, high-resolution image one frame before. In expression 1, N shows a pixel number of the student image that is used to calculate the pixel value of the teacher image and M shows a pixel number of the motion-compensated, high-resolution image one frame before used to calculate the pixel number of the teacher image.

For example, attention pixels are sorted for each class using the difference value of the pixel value of the student image and the estimated low-resolution image as a feature amount. In this case, the attention pixels become pixels to be obtained in the high-resolution image. Therefore, the feature amount that corresponds to the actual attention pixel is obtained from a pixel value of data in which the blur is removed by the blur removing unit, after the pixel interpolation by the up sampler is performed with respect to data of the difference of the pixel value of the student image and the estimated low-resolution image.

The attention pixels may be sorted for each class, using other methods. For example, the attention pixels may be sorted for each class, using adaptive dynamic range coding (ADRC).

As described above, after the attention pixels are sorted for each class, a plurality of samples of expression 1 are accumulated for each class. In addition, the coefficients wi and wj are calculated for each class, using a least-square method.

The coefficients wi and wj that are calculated as described above are stored in the learning database.

When the high-quality image processing is executed with respect to the actually input image, the coefficients wi and wj that are stored in the learning database are used.

Figure 12:
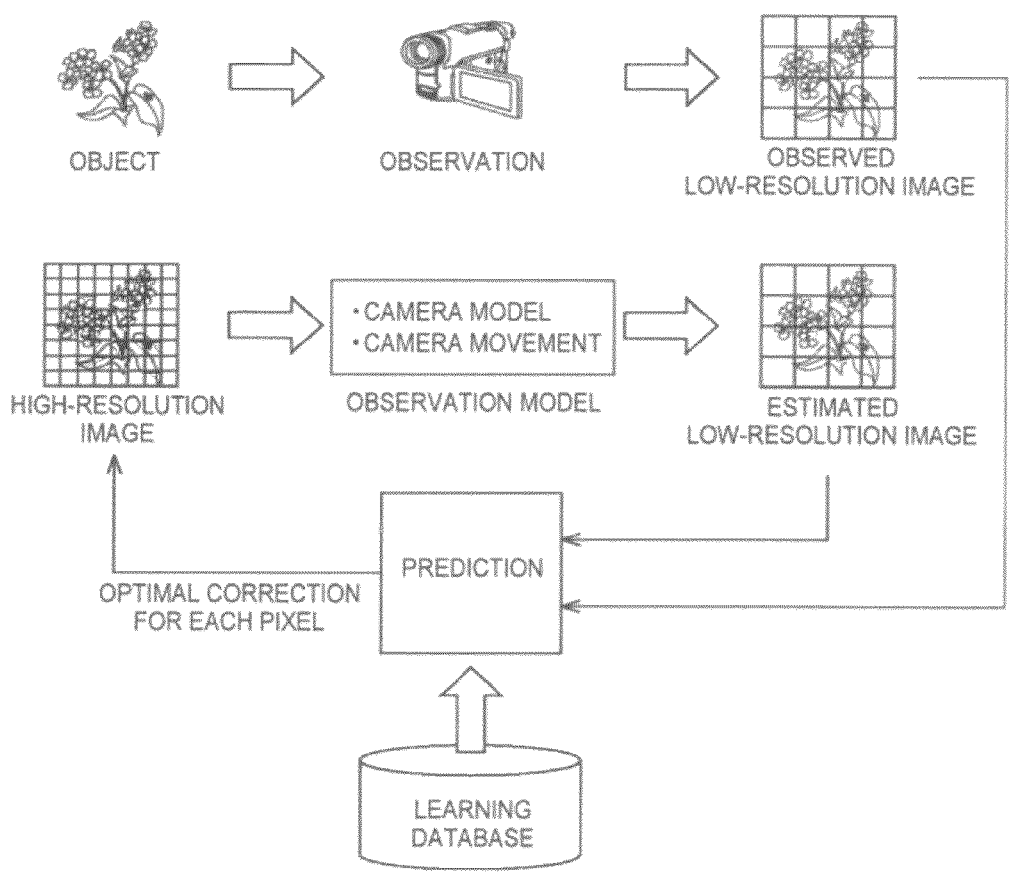
FIG. 12 is a conceptual diagram illustrating generation of a high-resolution image in the present disclosure.

That is, as illustrated in FIG. 12, the following processing is executed to convert the observed low-resolution image into the high-resolution image.

The object is photographed by the camera and the observed low-resolution image (for example, the image of the SDi signal) is obtained.

Meanwhile, the camera model (deterioration model) and the camera movement (aligning) when the object is photographed by the camera are added to a high-resolution image (for example, an image of an HDp signal) one frame before.

For example, blur is intentionally added to a high-resolution image one frame before and motion is compensated. Then, an image is down-sampled and the image is converted into a low-resolution image. As a result, an estimated low-resolution image (for example, an image of an SDi signal) is obtained. In this case, estimating (simulating) the PSF or the optical blur of the camera on the basis of the predetermined image and generating the image is called adding the blur.

The attention pixels are sorted for each class and a pixel value of a high-resolution image is predicted (operated) using a coefficient corresponding to the sorted class. In this case, similar to when the learning is performed, the attention pixels are sorted for each class using a difference value of the pixel value of the student image and the estimated low-resolution image as a feature amount. The coefficients wi and wj that are associated with the sorted classes and stored in the learning database are read.

For example, a pixel value of the high-resolution image to be predicted is set to y, a pixel value of the observed low-resolution image is set to xi, a pixel value of the motion-compensated, high-resolution image one frame before is set to xj, and the pixel value of the high-resolution image is predicted (operated) by an operation of expression 2.

$$y = \sum_{i}^{N} W_i X_i + \sum_{j}^{M} W_j X_j \quad (2)$$

In this case, a coefficient wi in expression 2 shows a coefficient that is multiplied with the pixel value of the observed low-resolution image and a coefficient wj shows a coefficient that is multiplied with the pixel value of the motion-compensated, high-resolution image one frame before, and the coefficients are read from the learning database according to the classes of the attention pixels. In expression 2, N shows a pixel number of the observed low-resolution image that is used to calculate the pixel value of the high-resolution image, M shows a pixel number of the motion-compensated, high-resolution image one frame before used to calculate the pixel value of the high-resolution image, and each pixel number is equal to the pixel number when the learning is performed.

The high-resolution image is updated by replacing each pixel value of the high-resolution image with a pixel value operated by the expression 2.

According to the present disclosure, different from the case of the super-resolution technology of related art described above with reference to FIG. 7, the operation of expression 2 is performed once with respect to one frame and a pixel of a high-resolution image that is similar to the ideal image is generated. Therefore, a processing load by the repeated operation is removed and high-speed processing is easily realized.

According to the present disclosure, the coefficients that are used in the operation of expression 2 are learned in advance and stored. Therefore, even if an estimation error occurs in the camera model or the aligning, bad effects such as overemphasis of an edge or detailed portion, overshoot, and emphasis of noise can be suppressed from occurring. This is because the coefficient to generate the image similar to the ideal image can be learned from a state in which the estimation error is included, even if the estimation error occurs in the camera model or the aligning.

Therefore, according to the present disclosure, because the camera model or the aligning is not necessarily adjusted perfectly, processing accuracy can be improved without complicating the configuration of the apparatus.

Figure 13:
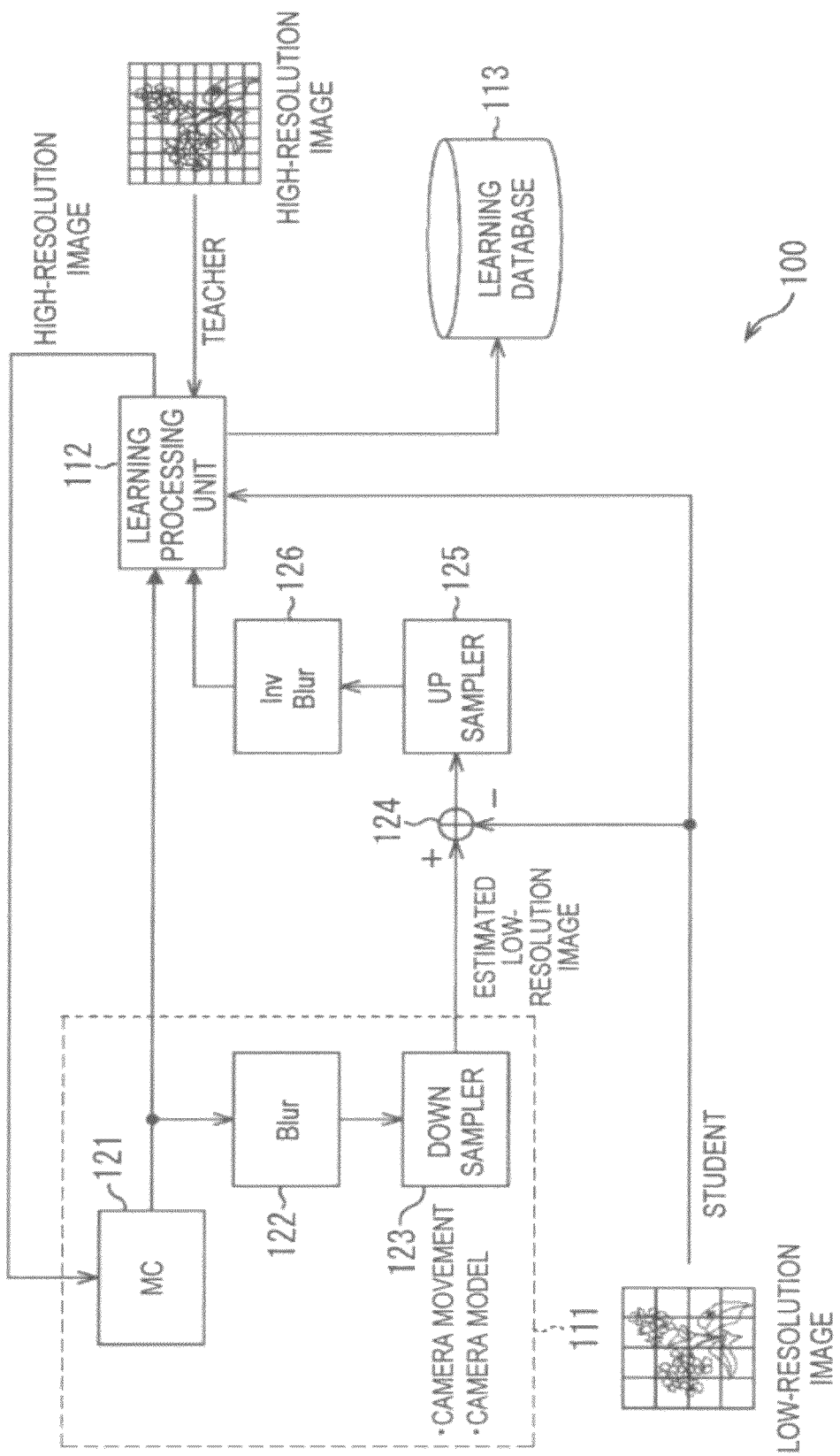
FIG. 13 is a block diagram illustrating a configuration example of a learning apparatus according to an embodiment of the present disclosure.

FIG. 13 is a block diagram illustrating a configuration example of a learning apparatus according to an embodiment of the present disclosure. In a learning apparatus 100, a high-resolution image is input as a teacher image and a low-resolution image generated by deteriorating the teacher image is input as a student image and the high-resolution image is generated from the student image. The generated high-resolution image and the teacher image are compared with each other and parameters to estimate a pixel value of the high-resolution image are calculated (learned) and stored in the learning database.

The learning apparatus 100 illustrated in FIG. 13 includes a model-based processing unit 111, a learning processing unit 112, a learning database 113, an adder 124, an up sampler 125, and a blur removing unit (InvBlur) 126. The model-based processing unit 111 includes a motion compensating unit (MC) 121, a blur adding unit (Blur) 122, and a down sampler 123.

That is, the learning apparatus 100 learns predetermined coefficients that are used to execute the model-based processing in the super-resolution technology of related art and generate the high-resolution image.

In FIG. 13, the motion compensating unit 121 receives a high-resolution image one frame before, calculates a motion vector, and compensates for motion. The motion-compensated, high-resolution image one frame before is supplied to the blur adding unit 122.

The blur adding unit 122 adds blur occurring when the object is photographed by the camera to the motion-compensated, high-resolution image one frame before. The motion-compensated, high-resolution image one frame before in which the blur is added is supplied to the down sampler 123.

The down sampler 123 thins out the pixels of the motion-compensated, high-resolution image one frame before in which the blur is added and generates a low-resolution image. Thereby, the estimated low-resolution image is generated.

The adder 124 computes a difference value (error) of each pixel of the estimated low-resolution image and each pixel of the observed low-resolution image. Data of the computation result is supplied to the up sampler 125.

The up sampler 125 interpolates pixels with respect to the computation result by the adder 124 to generate a high-resolution image and supplies the high-resolution image to the blur removing unit (InvBlur) 126.

The blur removing unit 126 removes the blur of the supplied high-resolution image. That is, processing for removing the blur added by the blur adding unit 122 is executed.

The blur adding unit 122 and the blur removing unit 126 may not be provided.

The student image, the teacher image, and the data output from the blur removing unit 126 are supplied to the learning processing unit 112. The learning processing unit 112 learns coefficients to estimate pixels of the high-resolution image on the basis of the pixels of the student image and the pixels of the motion-compensated, high-resolution image one frame before, as follows.

For example, the learning processing unit 112 sorts the attention pixels for each class and accumulates a plurality of samples of the expression 1 for each class, as described above. In addition, the coefficients wi and wj are calculated for each class, using a least-square method.

The coefficients wi and wj that are calculated as described above are stored in the learning database 113 as the processing result by the learning processing unit 112, for each class.

Figure 14:
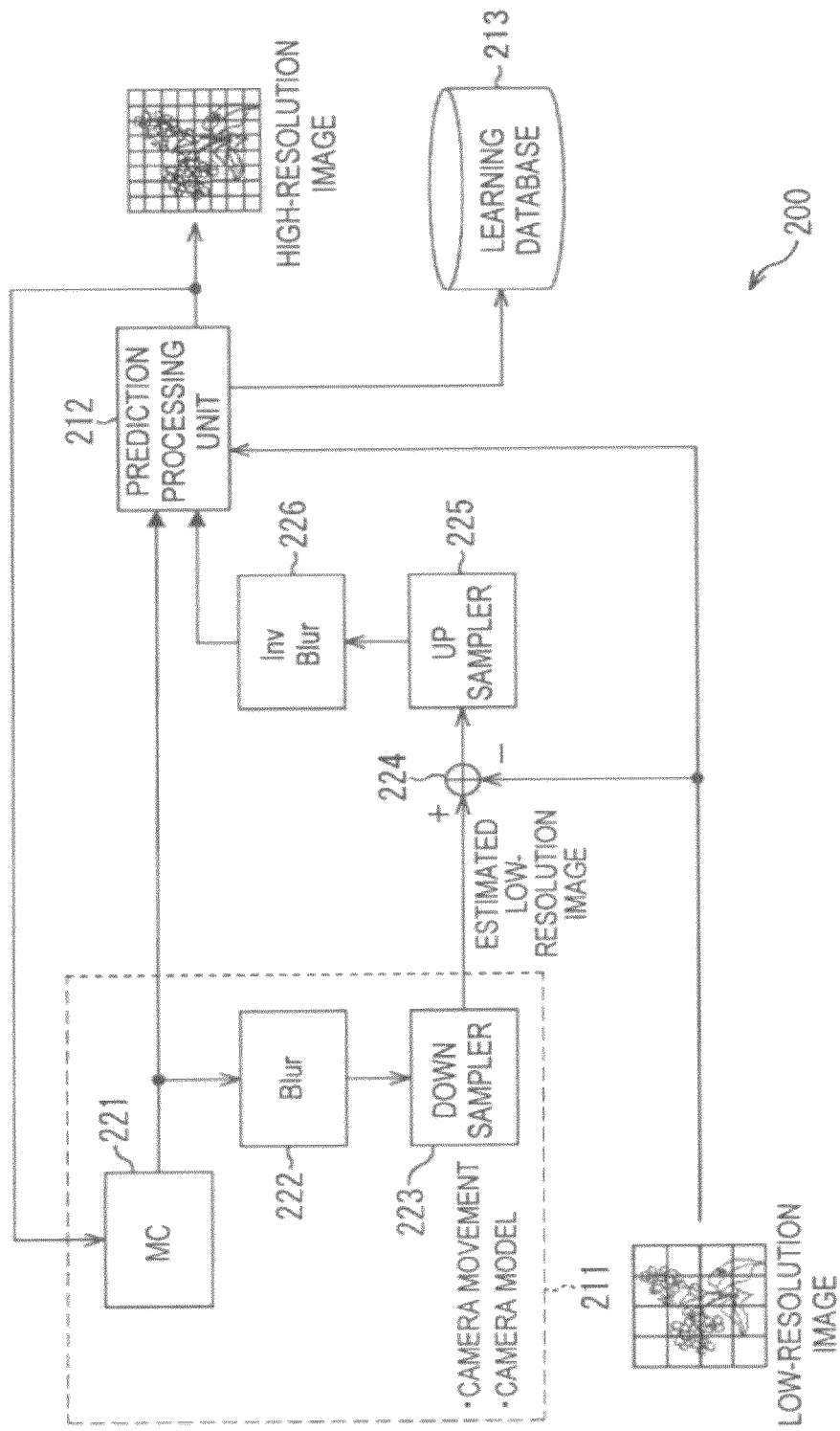
FIG. 14 is a block diagram illustrating a configuration example of an image processing apparatus according to the embodiment of the present disclosure.

FIG. 14 is a block diagram illustrating a configuration example of an image processing apparatus according to an embodiment of the present disclosure. An image processing apparatus 200 corresponds to the learning apparatus 100 of FIG. 13. The image processing apparatus 200 converts a low-resolution input image into a high-resolution output image using the learning result by the learning apparatus 100.

The image processing apparatus 200 illustrated in FIG. 14 includes a model-based processing unit 211, a prediction processing unit 212, a learning database 213, an adder 224, an up sampler 225, and a blur removing unit (InvBlur) 226. The model-based processing unit 211 includes a motion compensating unit (MC) 221, a blur adding unit (Blur) 222, and a down sampler 223.

That is, the image processing apparatus 200 executes prediction processing using the learning database in addition to the model-based processing in the super-resolution technology of related art. The learning database 213 in the image processing apparatus 200 is generated by copying information stored in the learning database 113.

In FIG. 14, the motion compensating unit 221 receives a high-resolution image one frame before, calculates a motion vector, and compensates for a motion. The motion-compensated, high-resolution image one frame before is supplied to the blur adding unit 222.

The blur adding unit 222 adds blur occurring when the object is photographed by the camera to the motion-compensated, high-resolution image one frame before. The motion-compensated, high-resolution image one frame before in which the blur is added is supplied to the down sampler 223.

The down sampler 223 thins out the pixels of the motion-compensated, high-resolution image one frame before in which the blur is added and generates a low-resolution image. Thereby, the estimated low-resolution image is generated.

The adder 224 computes a difference value (error) of each pixel of the estimated low-resolution image and each pixel of the observed low-resolution image. The computation result is supplied to the up sampler 225.

The up sampler 225 interpolates pixels with respect to the computation result by the adder 224 to generate a high-resolution image and supplies the high-resolution image to the blur removing unit (InvBlur) 226.

The blur removing unit 226 removes the blur of the supplied high-resolution image. That is, processing for removing the blur added by the blur adding unit 222 is executed.

A low-resolution image to be an input image, the motion-compensated, high-resolution image one frame before, and data output from the blur removing unit 226 are supplied to the prediction processing unit 212. The prediction processing unit 212 sorts the attention pixels for each class and reads the coefficient wi and the coefficient wj corresponding to the classes, from the learning database 213.

In addition, the prediction processing unit 212 performs the operation of expression 2 using the read coefficients wi and wj and predicts a pixel value of the high-resolution image. The high-resolution image is updated by replacing each pixel value of the high-resolution image with the pixel value operated by expression 2.

Figure 15:
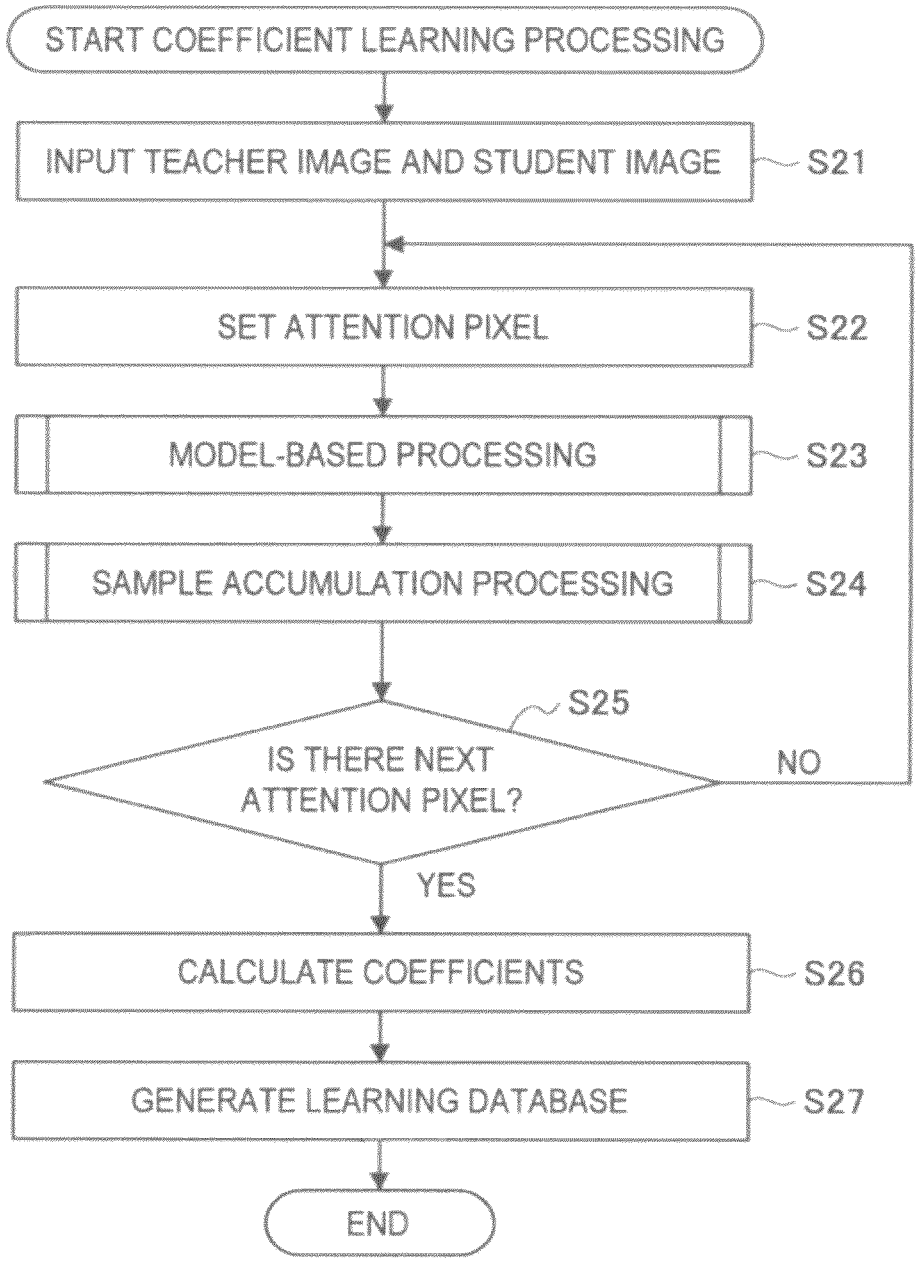
FIG. 15 is a flowchart illustrating an example of coefficient learning processing.

Next, an example of coefficient learning processing that is executed by the learning apparatus 100 of FIG. 13 will be described with reference to a flowchart of FIG. 15.

In step S21, the teacher image and the student image are input by a user.

In step S22, the attention pixel is set. The attention pixel becomes the pixel of the high-resolution image that becomes an object of the operation of the pixel value.

Figure 16:
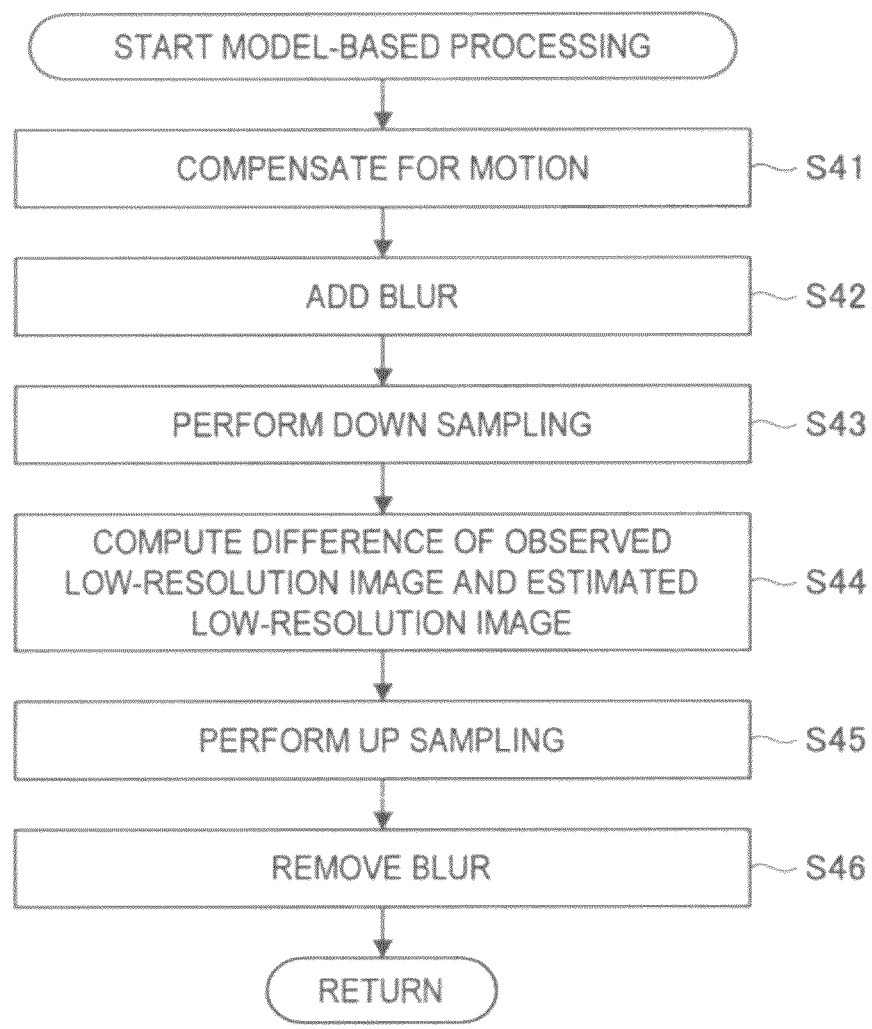
FIG. 16 is a flowchart illustrating an example of model-based processing.

In step S23, the model-based processing unit 111 executes model-based processing to be described below with reference to FIG. 16.

A detailed example of the model-based processing of step S23 of FIG. 15 will be described with reference to a flowchart of FIG. 16.

In step S41, the motion compensating unit 121 receives a high-resolution image one frame before, calculates a motion vector, and compensates for a motion.

In step S42, the blur adding unit 122 adds blur occurring when the object is photographed by the camera to the motion-compensated, high-resolution image one frame before. In this case, estimating (simulating) the PSF or the optical blur of the camera on the basis of the predetermined image and generating the image is called adding the blur.

In step S43, the down sampler 123 thins out (down-samples) the pixels of the motion-compensated, high-resolution image one frame before in which the blur is added and generates a low-resolution image. Thereby, the estimated low-resolution image is generated.

In step S44, the adder 124 computes a difference value (error) of each pixel of the estimated low-resolution image and each pixel of the observed low-resolution image (in this case, the student image).

In step S45, the up sampler 125 interpolates (up-samples) pixels with respect to the computation result by the adder 124 in step S44 to generate a high-resolution image.

In step S46, the blur removing unit 126 removes the blur of the supplied high-resolution image. That is, processing for removing the blur added by the blur adding unit 122 in the process of step S42 is executed.

In this way, the model-based processing is executed.

Figure 17:
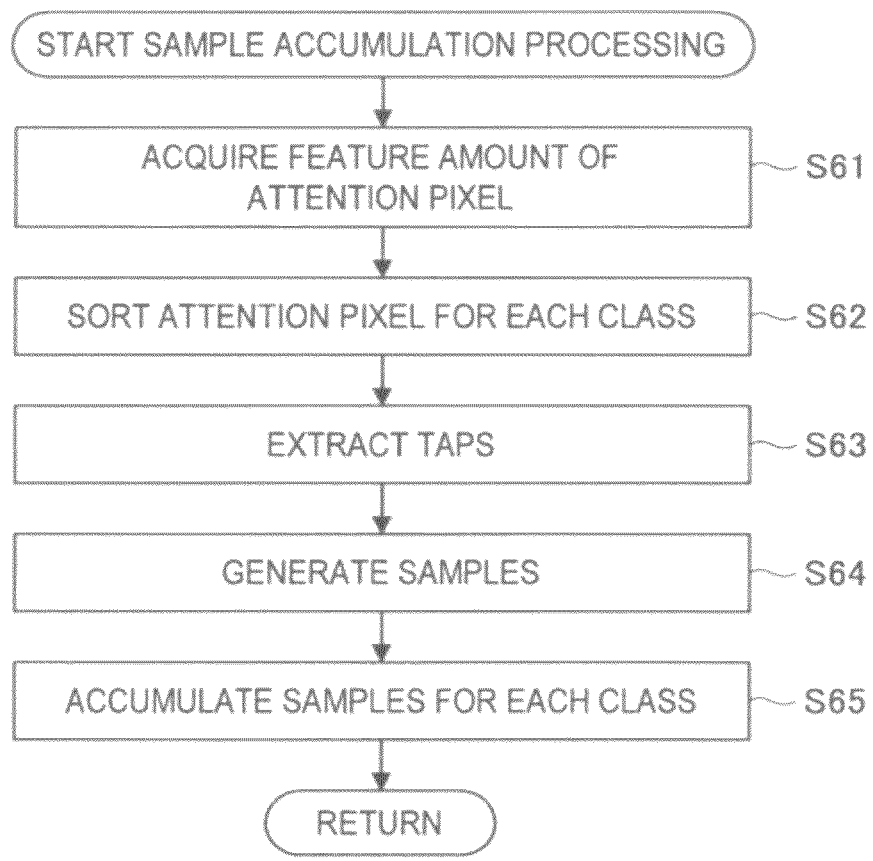
FIG. 17 is a flowchart illustrating an example of sample accumulation processing.

Returning to FIG. 15, after the process of step S23, the learning processing unit 112 executes sample accumulation processing to be described below with reference to FIG. 17, in step S24.

A detailed example of the sample accumulation processing of step S24 of FIG. 15 will be described with reference to a flowchart of FIG. 17.

In step S61, the learning processing unit 112 acquires a difference value of the pixel value of the student image and the estimated low-resolution image as the feature amount with respect to the attention pixel. The feature amount that corresponds to the actual attention pixel is obtained from a pixel value of data in which the blur is removed by the blur removing unit, after the pixel interpolation by the up sampler is performed with respect to data of the difference of the pixel value of the student image and the estimated low-resolution image.

The other feature amounts may be acquired.

In step S62, the learning processing unit 112 sorts the attention pixel for each class on the basis of the feature amount acquired in step S61.

In step S63, the learning processing unit 112 extracts taps. At this time, the N pixels of the student image and M pixels of the motion-compensated, high-resolution image one frame before are extracted as the taps.

In step S64, the learning processing unit 112 generates the samples of the expression 1 to be associated with the classes sorted by the process of step S62. That is, the samples are generated by substituting the pixel value of the teacher image for yt of expression 1 and values of the taps extracted in the process of step S63 for xi and xj, respectively.

In step S65, the learning processing unit 112 accumulates the samples for each class.

In this way, the sample accumulation processing is executed.

Returning to FIG. 15, after the process of step S24, the process proceeds to step S25 and it is determined whether there is a next attention pixel. In step S25, when it is determined that there is a next attention pixel, the process returns to step S22 and the following process is repetitively executed.

In step S25, when it is determined that there is no next attention pixel, the process proceeds to step S26.

In step S26, the learning processing unit 112 calculates the coefficient wi and the coefficient wj using the least-square method for each class on the basis of the samples accumulated in the process of step S65.

In step S27, the learning processing unit 112 generates the learning database 113 in which the coefficients wi and wj calculated by the process of step S26 are associated with the classes and stored.

In this way, the coefficient learning processing is executed.

Figure 18:
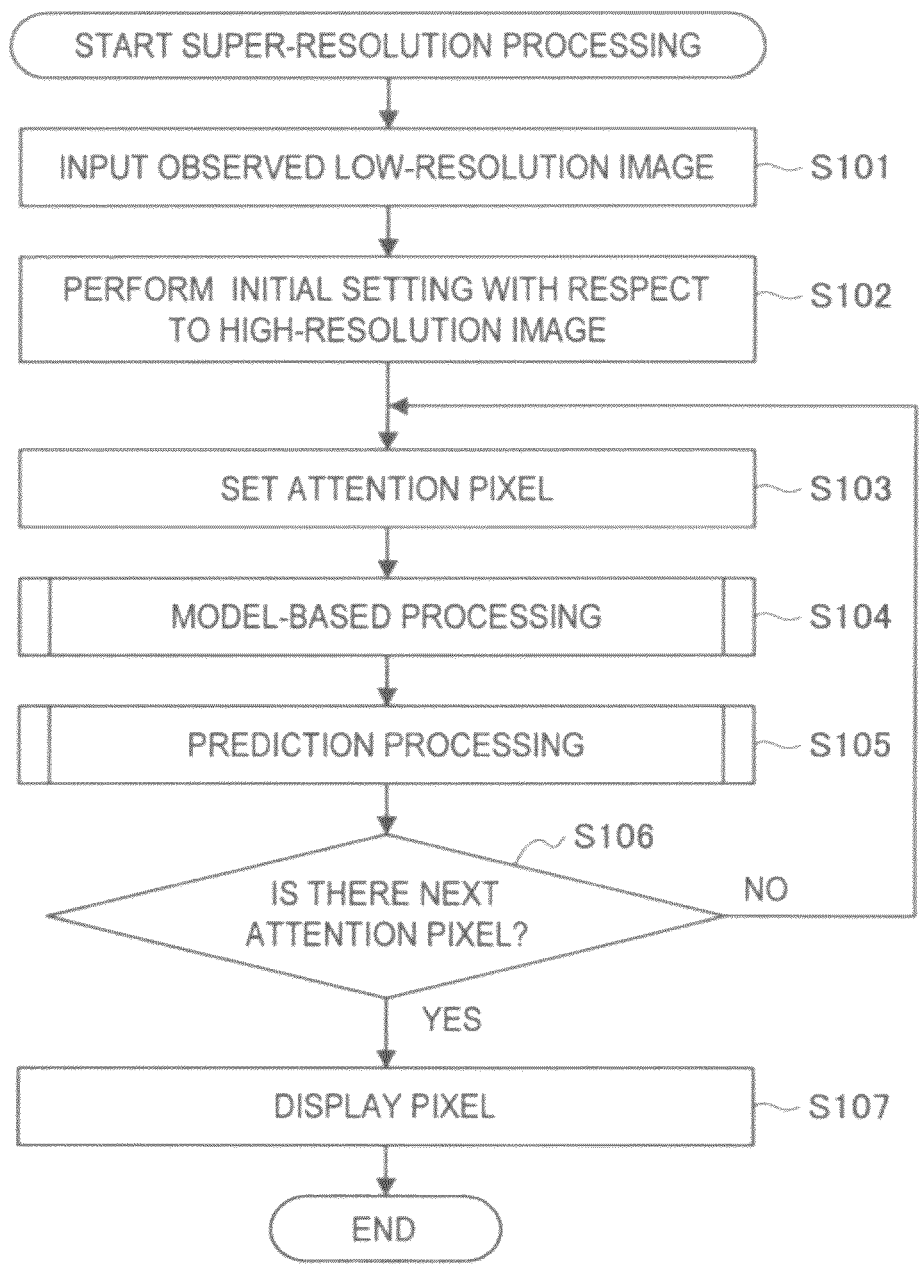
FIG. 18 is a flowchart illustrating an example of super-resolution processing.

Next, an example of the super-resolution processing that is executed by the image processing apparatus 200 of FIG. 14 will be described with reference to a flowchart of FIG. 18. Before the super-resolution processing, information that is stored in the learning database 113 is copied into the learning database 213 in the image processing apparatus 200.

In step S101, the observed low-resolution image is input by the user.

In step S102, a first high-resolution image is generated (initial setting is given). For example, an image that is obtained by up-sampling an image of a first frame of the observed low-resolution image is generated as the first high-resolution image.

In step S103, the attention pixel is set. The attention pixel becomes a pixel of the high-resolution image that becomes an object of the operation of the pixel value.

In step S104, the model-based processing unit 211 executes the model-based processing. Because the model-based processing executed in step S104 is the same as the processing described above with reference to FIG. 16, the detailed description thereof is omitted.

Figure 19:
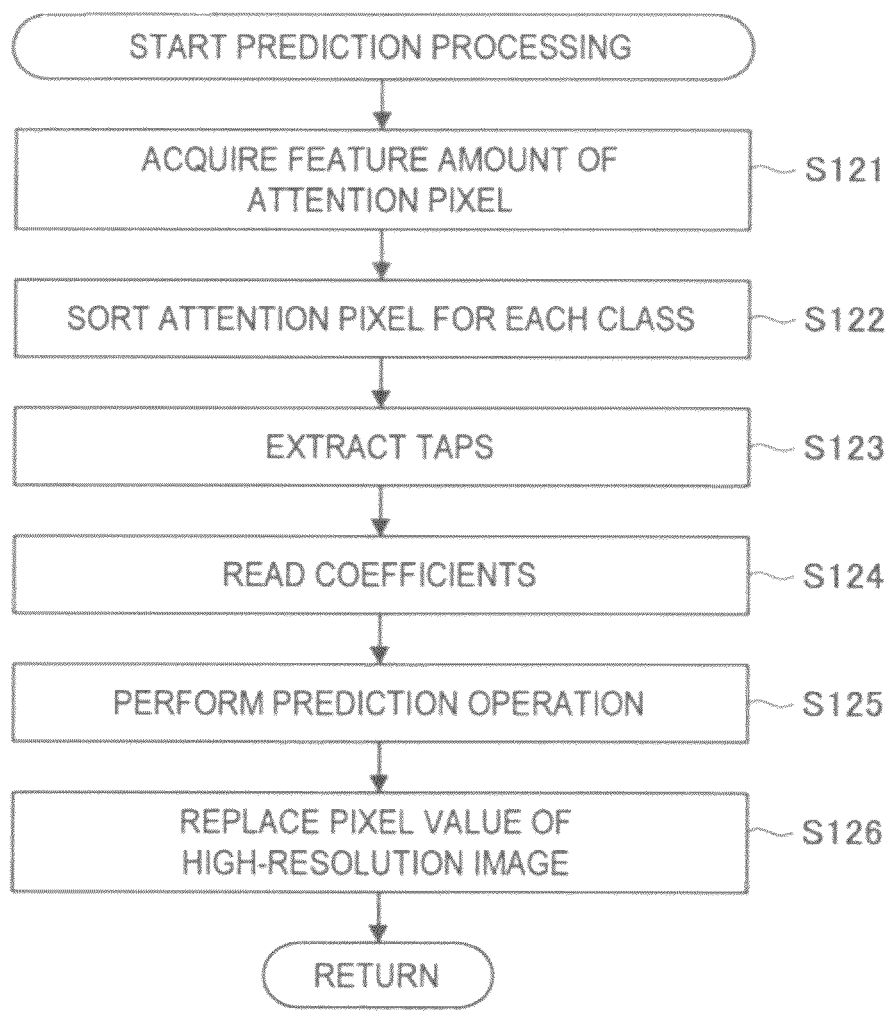
FIG. 19 is a flowchart illustrating an example of prediction processing.

In step S105, the prediction processing unit 212 executes prediction processing to be described below with reference to FIG. 19.

A detailed example of the prediction processing of step S105 of FIG. 18 will be described with reference to a flowchart of FIG. 19.

In step S121, the learning processing unit 212 acquires a difference value of the pixel value of the observed low-resolution image and the estimated low-resolution image as a feature amount with respect to the attention pixel. The feature amount that corresponds to the actual attention pixel is obtained from a pixel value of data in which the blur is removed by the blur removing unit, after the pixel interpolation by the up sampler is performed with respect to data of the difference of the pixel value of the observed low-resolution image and the estimated low-resolution image.

The other feature amounts may be acquired.

In step S122, the learning processing unit 212 classifies the attention pixel for each class on the basis of the feature amount acquired in step S121.

In step S123, the prediction processing unit 212 extracts taps. At this time, N pixels of the observed low-resolution image and M pixels of the motion-compensated, high-resolution image one frame before are extracted as the taps.

In step S124, the prediction processing unit 212 reads the coefficients wi and wj corresponding to the classes sorted in the process of step S122, from the learning database 213.

In step S125, the prediction processing unit 212 performs a prediction operation. That is, the prediction processing unit 212 performs the operation of expression 2 using the taps extracted in the process of step S123 and the coefficients wi and wj read in the process of step S124 and predicts the pixel value of the high-resolution image.

In step S126, the prediction processing unit 212 replaces each pixel value of the high-resolution image with the pixel value obtained as the result of the process of step S124.

In this way, the prediction processing is executed.

Returning to FIG. 18, after the process of step S105, the process proceeds to step S106 and it is determined whether there is a next attention pixel. In step S106, when it is determined that there is a next attention pixel, the process returns to step S103 and the following process is repetitively executed.

Meanwhile, in step S106, when it is determined that there is no next attention pixel, the process proceeds to step S107.

In step S107, the high-resolution image is displayed as an output image.

In this way, the super-resolution processing is executed.

In the above-described configuration, the learning apparatus 100 adopts the learning algorithm in which the attention pixels are sorted for each class and the coefficients necessary for generating the pixels of the high-resolution image are calculated by the least-square method for each class. However, the learning apparatus 100 may adopt a learning algorithm that is different from the learning algorithm described above.

For example, a neural network or a support vector machine (SVM) may be adopted as the learning algorithm.

The series of processes described above may be performed by hardware or software. In the case of performing the series of processes by software, programs constituting the software are installed, from a network or a recording medium, on a computer that is incorporated in dedicated hardware, a general-purpose personal computer as shown in FIG. 20, for example, that is capable of performing various functions by installing various programs, or the like.

Figure 20:
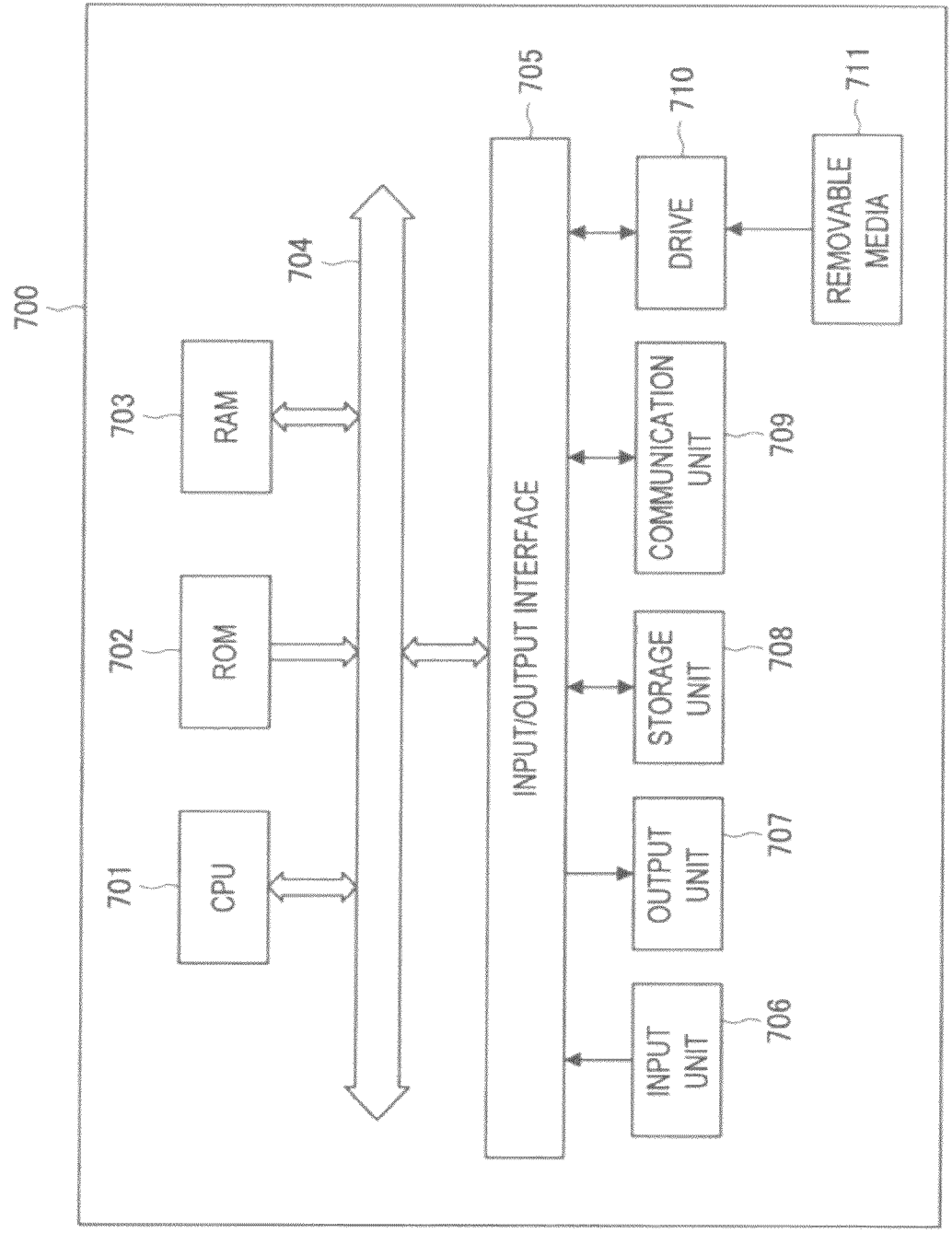
FIG. 20 is a block diagram illustrating a configuration example of a personal computer.

In FIG. 20, the CPU (Central Processing Unit) 701 performs various processes according to programs stored in a ROM (Read Only Memory) 702 or programs loaded from a storage unit 708 on a RAM (Random Access Memory) 703. Data necessary for the CPU 701 to perform various processes is also stored in the RAM 703 as necessary.

The CPU 701, the ROM 702 and the RAM 703 are connected to each other via a bus 704. An input/output interface 705 is also connected to this bus 704.

Connected to the input/output interface 705 are an input unit 706 configured from a keyboard, a mouse and the like, an output unit 707 configured from a display such as an LCD (Liquid Crystal display) or the like, a speaker and the like, a storage unit 708 configured from a hard disk or the like, and a communication unit 709 configured from a network interface such as a modem or a LAN card, or the like. The communication unit 709 performs a communication process via a network including the Internet.

A drive 710 is also connected to the input/output interface 705 as necessary and a removable media 711, such as a magnetic disk, an optical disk, a magneto-optical disk or a semiconductor memory, is mounted thereon as necessary, and computer programs read therefrom are installed on the storage unit 708 as necessary.

In the case of causing software to perform the series of processes described above, programs constituting the software are installed from a network such as the Internet or a recording medium configured from the removable media 711 or the like.

Additionally, this recording medium may be the removable media 711 as shown in FIG. 20 configured from a magnetic disk (including a floppy disk (registered trademark), an optical disk (including a CD-ROM (Compact Disk-Read Only Memory), and a DVD (Digital Versatile Disk)), a magneto-optical disk (including an MD (Mini-Disk) (registered trademark)), a semiconductor memory or the like on which programs are recorded and that is provided to a user, separately from the device itself, to distribute the programs, but may also be the ROM 702 on which programs are recorded or a hard disk included in the storage unit 708 that are provided, being embedded in advance in the device itself, to a user.

Additionally, the series of processes described above in the present specification may, of course, be performed chronologically according to the order described, but may also be performed in parallel or individually without being performed chronologically.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image processing apparatus including:
a model-based processing unit that executes model-based processing for converting resolution and converting an image on the basis of a camera model and a predetermined model having aligning, with respect to a high-resolution image output one frame before; and
a prediction operation unit that performs a prediction operation on a pixel value of a high-resolution image to be output, on the basis of parameters stored in advance, an observed low-resolution image that is an input low-resolution image, and an image obtained by executing the model-based processing.

(2) The image processing apparatus according to (1),
wherein the prediction operation unit reads the parameter stored in a learning database generated in advance by learning and performs the prediction operation.

(3) The image processing apparatus according to (1) or (2),
wherein the model-based processing unit includes:
a motion compensating unit that compensates for a motion of the high-resolution image output one frame before;
a down sampler that restricts a band of the motion compensated high-resolution image output one frame before according to the camera model, thins out pixels, and generates an estimated low-resolution image;
a difference computation unit that computes a difference of the observed low-resolution image that is the input low-resolution image and the estimated low-resolution image and generates difference image data; and
an up sampler that interpolates pixels of the difference image data and thereby generates a high-resolution image.

(4) The image processing apparatus according to any of (1) to (3),
wherein the model-based processing unit includes:
a blur adding unit that adds blur to the high-resolution image output one frame before; and
a blur removing unit that removes the blur added by the blur adding unit.

(5) The image processing apparatus according to any of (1) to (4), further including:
a class sorting unit that sorts attention pixels for each class on the basis of a feature amount calculated in the course of the model-based processing,
wherein the prediction operation unit performs a predetermined operation using coefficients stored in advance as parameters corresponding to the sorted classes and performs the prediction operation on the pixel value of the high-resolution image to be output.

(6) The image processing apparatus according to any of (1) to (5), further including:
a tap extracting unit that extracts predetermined pixels of the observed low-resolution image that is the input low-resolution image and predetermined pixels of the image obtained by executing the model-based processing with respect to the high-resolution image output one frame before as taps,
wherein the prediction operation unit performs a predetermined operation regarding the taps on the basis of the parameters stored in advance, and performs the prediction operation on the pixel value of the high-resolution image to be output.

(7) An image processing method including:
executing, by a model-based processing unit, model-based processing for converting resolution and converting an image on the basis of a camera model and a predetermined model having aligning, with respect to a high-resolution image output one frame before; and
performing, by a prediction operation unit, a prediction operation on a pixel value of a high-resolution image to be output, on the basis of parameters stored in advance, an observed low-resolution image that is an input low-resolution image, and an image obtained by executing the model-based processing.

(8) A program for causing a computer to function as an image processing apparatus,
wherein the image processing apparatus includes:
a model-based processing unit that executes model-based processing for converting resolution and converting an image on the basis of a camera model and a predetermined model having aligning, with respect to a high-resolution image output one frame before; and
a prediction operation unit that performs a prediction operation on a pixel value of a high-resolution image to be output, on the basis of parameters stored in advance, an observed low-resolution image that is an input low-resolution image, and an image obtained by executing the model-based processing.

(9) A recording medium in which the program according to (8) is recorded.

(10) A learning apparatus including:
a model-based processing unit that executes model-based processing for converting resolution and converting an image on the basis of a camera model and a predetermined model having aligning, with respect to a high-resolution image output one frame before;
a tap extracting unit that extracts predetermined pixels of a student image with low resolution obtained by converting resolution of a teacher image with high resolution and predetermined pixels of an image obtained by executing the model-based processing with respect to the high-resolution image output one frame before as taps;
a sample accumulating unit that accumulates equations including the taps, predetermined parameters, and a pixel value of the teacher image as samples; and
a parameter calculating unit that calculates the predetermined parameters used in a prediction operation of a pixel value of a high-resolution image to be output, on the basis of the accumulated samples.

(11) The learning apparatus according to (10), further including:
a database that stores the calculated parameters,
wherein the database is used in image processing of an image processing apparatus for converting an input low-resolution image into a high-resolution image.

(12) The learning apparatus according to (10) or (11),
wherein the model-based processing unit includes:
a motion compensating unit that compensates for a motion of the high-resolution image output one frame before;
a down sampler that restricts a band of the motion compensated high-resolution image output one frame before according to the camera model, thins out pixels, and generates an estimated low-resolution image;
a difference computation unit that computes a difference of the student image and the estimated low-resolution image and generates difference image data; and
an up sampler that interpolates pixels of the difference image data and generates a high-resolution image.
(13) The learning apparatus according to any of (10) to (12),
wherein the model-based processing unit includes:
a blur adding unit that adds blur to the high-resolution image output one frame before; and
a blur removing unit that removes the blur added by the blur adding unit.
(14) The learning apparatus according to any of (10) to (13), further including:
a class sorting unit that sorts attention pixels for each class on the basis of a feature amount calculated in the course of the model-based processing,
wherein the parameter calculating unit calculates coefficients by which the taps are multiplied when the prediction operation is performed on the pixel value of the high-resolution image to be output as parameters corresponding to the sorted classes.
(15) A learning method including:
executing, by a model-based processing unit, model-based processing for converting resolution and converting an image on the basis of a camera model and a predetermined model having aligning, with respect to a high-resolution image output one frame before;
extracting, by a tap extracting unit, predetermined pixels of a student image with low resolution obtained by converting resolution of a teacher image with high resolution and predetermined pixels of an image obtained by executing the model-based processing with respect to the high-resolution image output one frame before as taps;
accumulating, by a sample accumulating unit, equations including the taps, predetermined parameters, and a pixel value of the teacher image as samples; and
calculating, by a parameter calculating unit, the predetermined parameters used in a prediction operation of a pixel value of a high-resolution image to be output, on the basis of the accumulated samples.
(16) A program for causing a computer to function as a learning apparatus,
wherein the learning apparatus includes:
a model-based processing unit that executes model-based processing for converting resolution and converting an image on the basis of a camera model and a predetermined model having aligning, with respect to a high-resolution image output one frame before;
a tap extracting unit that extracts predetermined pixels of a student image with low resolution obtained by converting resolution of a teacher image with high resolution and predetermined pixels of an image obtained by executing the model-based processing with respect to the high-resolution image output one frame before as taps;
a sample accumulating unit that accumulates equations including the taps, predetermined parameters, and a pixel value of the teacher image as samples; and a parameter calculating unit that calculates the predetermined parameters used in a prediction operation of a pixel value of a high-resolution image to be output, on the basis of the accumulated samples.
(17) A recording medium in which the program according to (16) is recorded.

The present application contains subject matter related to that disclosed in Japanese Priority Patent Application JP 2011-112311 filed in the Japan Patent Office on May 19, 2011, the entire content of which is hereby incorporated by reference.

What is claimed is:
1. An image processing apparatus comprising:
a central processing unit operable to:
generate an estimated low-resolution image from a first high-resolution image output one frame before, wherein the estimated low-resolution image is generated by performing motion compensation on the first high-resolution image; and
predict a pixel value for a second high-resolution image to be output based on the estimated low-resolution image, an observed low-resolution image, first parameters stored in advance and second parameters stored in advance,
wherein the pixel value for the second high-resolution image is predicted based on summation of products of the first parameters and corresponding pixel values of the observed low-resolution image, and products of the second parameters and corresponding pixel values of the motion compensated first high-resolution image.
2. The image processing apparatus according to claim 1, wherein the central processing unit is operable to read the first parameters and the second parameters stored in a learning database generated in advance by learning.
3. The image processing apparatus according to claim 1, wherein the central processing unit is operable to:
compensate for a motion of the first high-resolution image;
restrict a band of the motion compensated first high-resolution image according to a camera model, thin out pixels of the restricted motion compensated first high-resolution image, and generate the estimated low-resolution image;
compute a difference of the observed low-resolution image that is an input low-resolution image and the estimated low-resolution image, and generate difference image data; and
interpolate pixels of the difference image data and thereby generate the second high-resolution image.
4. The image processing apparatus according to claim 1, wherein the central processing unit is operable to:
add blur to the first high-resolution image; and
remove the blur from an up-sampled difference image,
wherein the difference image is generated from a down-sampled first high-resolution image and the observed low-resolution image.
5. The image processing apparatus according to claim 1, wherein the central processing unit is operable to:
sort attention pixels for each class based on a feature amount, wherein the feature amount is a difference value between a pixel of the estimated low-resolution image and a corresponding pixel of a low-resolution student image; and
perform a predetermined operation using the first parameters and the second parameters corresponding to sorted classes stored in advance and predict the pixel value of the second high-resolution image.

6. The image processing apparatus according to claim 1, wherein the central processing unit is operable to:
  extract predetermined pixels of the observed low-resolution image that is an input low-resolution image and predetermined pixels of the estimated low-resolution image obtained with respect to the first high-resolution image as taps; and
  perform a predetermined operation regarding the taps based on the first parameters and the second parameters stored in advance, and predict the pixel value of the second high-resolution image.

7. An image processing method comprising:
in a central processing unit:
  generating an estimated low-resolution image from a first high-resolution image output one frame before, wherein the estimated low-resolution image is generated by performing motion compensation on the first high-resolution image; and
  predicting a pixel value for a second high-resolution image to be output based on the estimated low-resolution image, an observed low-resolution image, first parameters stored in advance and second parameters stored in advance,
  wherein the pixel value for the second high-resolution image is predicted based on summation of products of the first parameters and corresponding pixel values of the observed low-resolution image, and products of the second parameters and corresponding pixel values of the motion compensated first high-resolution image.

8. The image processing method of claim 7, further comprises predicting the pixel value once with respect to an image frame to generate the second high-resolution image.

9. A non-transitory computer-readable storage medium having stored thereon, a computer program having at least one code section for image processing, the at least one code section being executable by a computer for causing the computer to perform steps comprising:
  generating an estimated low-resolution image from a first high-resolution image output one frame before, wherein the estimated low-resolution image is generated by performing motion compensation on the first high-resolution image; and
  predicting a pixel value for a second high-resolution image to be output based on the estimated low-resolution image, an observed low-resolution image, first parameters stored in advance and second parameters stored in advance,
  wherein the pixel value for the second high-resolution image is predicted based on summation of products of the first parameters and corresponding pixel values of the observed low-resolution image, and products of the second parameters and corresponding pixel values of the motion compensated first high-resolution image.

* * * * *